United States Patent
Zhou et al.

(10) Patent No.: US 10,038,917 B2
(45) Date of Patent: Jul. 31, 2018

(54) SEARCH STRATEGIES FOR INTRA-PICTURE PREDICTION MODES

(71) Applicant: Microsoft Technology Licensing, LLC, Redmond, WA (US)

(72) Inventors: You Zhou, Sammamish, WA (US); Chih-Lung Lin, Redmond, WA (US); Ming-Chieh Lee, Bellevue, WA (US); Binlong Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 14/738,808

(22) Filed: Jun. 12, 2015

(65) Prior Publication Data

US 2016/0366437 A1 Dec. 15, 2016

(51) Int. Cl.
*H04N 19/11* (2014.01)
*H04N 19/593* (2014.01)
(Continued)

(52) U.S. Cl.
CPC ........... *H04N 19/593* (2014.11); *H04N 19/11* (2014.11); *H04N 19/147* (2014.11);
(Continued)

(58) Field of Classification Search
CPC .... H04N 19/593; H04N 19/176; H04N 19/11; H04N 19/192; H04N 19/147; H04N 19/51

See application file for complete search history.

(56) References Cited

U.S. PATENT DOCUMENTS

| 7,260,148 B2 | 8/2007 | Sohm |
| 7,580,456 B2 | 8/2009 | Li et al. |

(Continued)

FOREIGN PATENT DOCUMENTS

| CN | 1694533 | 11/2005 |
| CN | 102055977 | 5/2011 |

(Continued)

OTHER PUBLICATIONS

Al et al., "Quality and Complexity Comparison of H.264 Intra Mode with JPEG2000 and JPEG," *IEEE Int'l Conf. on Image Processing*, vol. 1, pp. 525-528 (Oct. 2004).

(Continued)

*Primary Examiner* — Neil Mikeska
(74) *Attorney, Agent, or Firm* — Klarquist Sparkman, LLP

(57) ABSTRACT

Innovations are presented that reduce the computational complexity of video encoding by selectively skipping certain evaluation stages during intra-picture prediction. A video encoder receives and encodes a current picture. As part of the encoding, for a current block of the current picture, the video encoder evaluates at least some intra-picture prediction modes ("IPPMs"). According to a search strategy, the video encoder selectively skips time-consuming evaluation of certain IPPMs for the current block when those IPPMs are not expected to improve rate-distortion performance, which can dramatically speed up the encoding process. For example, the video encoder conditionally performs a gradient search among angular IPPMs. Or, as another example, the video encoder selectively skips evaluation of IPPMs depending on a cost of encoding the current block using motion compensation. Or, as another example, the video encoder prioritizes IPPMs evaluated for a block of chroma sample values.

24 Claims, 14 Drawing Sheets

(51) Int. Cl.
*H04N 19/176* (2014.01)
*H04N 19/51* (2014.01)
*H04N 19/192* (2014.01)
*H04N 19/147* (2014.01)

(52) U.S. Cl.
CPC ......... *H04N 19/176* (2014.11); *H04N 19/192* (2014.11); *H04N 19/51* (2014.11)

(56) References Cited

U.S. PATENT DOCUMENTS

| | | | |
|---|---|---|---|
| 7,764,738 | B2 | 7/2010 | Kim et al. |
| 7,843,995 | B2 | 11/2010 | Bhaskaran et al. |
| 7,903,733 | B2 | 3/2011 | Panda et al. |
| 8,254,455 | B2 | 8/2012 | Wu et al. |
| 8,270,467 | B1 | 9/2012 | Wang |
| 8,331,449 | B2 | 12/2012 | Kim et al. |
| 8,335,255 | B2 | 12/2012 | Lee et al. |
| 8,379,728 | B2 | 2/2013 | Katzur et al. |
| 8,379,996 | B2 | 2/2013 | Murata et al. |
| 8,428,373 | B2 | 4/2013 | Jeon et al. |
| 8,457,202 | B2 | 6/2013 | Wang et al. |
| 8,467,448 | B2 | 6/2013 | Hsiang et al. |
| 8,514,933 | B2 | 8/2013 | Liang et al. |
| 8,693,551 | B2 | 4/2014 | Zheludkov et al. |
| 8,737,477 | B2 | 5/2014 | La et al. |
| 8,743,949 | B2 | 6/2014 | Srinivasan et al. |
| 8,804,836 | B2 | 8/2014 | Nilsson et al. |
| 9,137,544 | B2 | 9/2015 | Lin et al. |
| 2004/0264575 | A1 | 12/2004 | Bjontegaard |
| 2005/0084012 | A1 | 4/2005 | Hsu et al. |
| 2006/0164543 | A1 | 7/2006 | Richardson et al. |
| 2007/0030894 | A1 | 2/2007 | Tian et al. |
| 2007/0031051 | A1 | 2/2007 | Lee et al. |
| 2007/0140344 | A1 | 6/2007 | Shima |
| 2007/0177668 | A1 | 8/2007 | Park |
| 2007/0274396 | A1 | 11/2007 | Zhang et al. |
| 2009/0190660 | A1 | 7/2009 | Kusakabe et al. |
| 2009/0245353 | A1 | 10/2009 | Choi et al. |
| 2010/0020872 | A1 | 1/2010 | Shmizu et al. |
| 2010/0061447 | A1 | 3/2010 | Tu et al. |
| 2010/0150253 | A1 | 6/2010 | Kuo et al. |
| 2010/0290521 | A1 | 11/2010 | Liu et al. |
| 2011/0013700 | A1 | 1/2011 | Kim |
| 2011/0051813 | A1 | 3/2011 | Krishnan et al. |
| 2011/0164677 | A1* | 7/2011 | Lu .............. H04N 19/176 375/240.02 |
| 2011/0200264 | A1 | 8/2011 | Park |
| 2011/0243225 | A1 | 10/2011 | Min et al. |
| 2011/0274357 | A1 | 11/2011 | Iwamoto et al. |
| 2011/0286520 | A1* | 11/2011 | Xu .............. H04N 19/176 375/240.12 |
| 2011/0292998 | A1 | 12/2011 | Ohgose et al. |
| 2012/0195366 | A1 | 8/2012 | Liu et al. |
| 2012/0281760 | A1 | 11/2012 | Kim |
| 2013/0003838 | A1 | 1/2013 | Gao et al. |
| 2013/0003860 | A1 | 1/2013 | Sasai et al. |
| 2013/0016777 | A1 | 1/2013 | Gao et al. |
| 2013/0028317 | A1* | 1/2013 | Parfenov ......... H04N 19/176 375/240.12 |
| 2013/0089143 | A1* | 4/2013 | Siddaramanna ..... H04N 19/159 375/240.12 |
| 2013/0114696 | A1* | 5/2013 | Liu .............. H04N 19/176 375/240.03 |
| 2013/0114730 | A1 | 5/2013 | Joshi et al. |
| 2013/0121401 | A1* | 5/2013 | Zheludkov ......... H04N 19/65 375/240.02 |
| 2013/0128964 | A1* | 5/2013 | Chien ............ H04N 19/00569 375/240.12 |
| 2013/0343462 | A1 | 12/2013 | Li et al. |
| 2013/0343464 | A1 | 12/2013 | Van der Auwera et al. |
| 2014/0064359 | A1 | 3/2014 | Rapaka et al. |
| 2014/0079133 | A1 | 3/2014 | Sato |
| 2014/0219331 | A1 | 8/2014 | Pai et al. |
| 2014/0219342 | A1 | 8/2014 | Yu et al. |
| 2014/0219349 | A1* | 8/2014 | Chien ............ H04N 19/105 375/240.13 |
| 2014/0229186 | A1 | 8/2014 | Mehrotra et al. |
| 2014/0301465 | A1 | 10/2014 | Kwon et al. |
| 2015/0098500 | A1 | 4/2015 | Oh et al. |
| 2015/0271510 | A1* | 9/2015 | Wen ............ H04N 19/40 375/240.02 |
| 2016/0094855 | A1 | 3/2016 | Zhou |

FOREIGN PATENT DOCUMENTS

| | | |
|---|---|---|
| CN | 102148989 | 8/2011 |
| CN | 102665078 | 9/2012 |
| CN | 103118262 | 5/2013 |
| CN | 103248895 | 8/2013 |
| CN | 103281538 | 9/2013 |
| CN | 103384327 | 11/2013 |
| CN | 103553325 | 1/2014 |
| CN | 103763570 | 4/2014 |
| EP | 1369820 | 12/2003 |
| EP | 1761069 | 3/2007 |
| EP | 2618572 | 7/2013 |
| JP | 2003-244696 | 8/2003 |
| WO | WO 2004/080084 | 9/2004 |
| WO | WO 2012/071949 | 6/2012 |
| WO | WO 2013/028580 | 2/2013 |
| WO | WO 2013/143103 | 10/2013 |
| WO | WO 2013/181821 | 12/2013 |
| WO | WO 2014/083491 | 6/2014 |

OTHER PUBLICATIONS

Armbrust, "Capturing Growth: Photo Apps and Open Graph," 8 pp., downloaded from https://developers.facebook.com/blog/post/2012/07/17/capturing-growth—photo-apps-and-open-graph/ (Jul. 17, 2012).

Bjontegaard, "Calculation of Average PSNR Differences Between RD-curves," ITU-T VCEG-M33, 4 pp. (Apr. 2001).

Bross et al., "High Efficiency Video Coding (HEVC) Text Specification draft 8," JCTVC-J1003_d7, 260 pp. (Jul. 2012).

Chang et al., "A Two Level Mode Decision Algorithm for H.264 High Profile Intra Encoding," *IEEE Int'l Symp. On Circuits and Systems*, pp. 508-511 (May 2012).

Chen et al., "Fast Integer Pel and Fractional Pel Motion Estimation for AVC," ISO/IEC MPEG 2002/M9117, 16 pp. (Nov. 2002).

Chen et al., "Fast Motion Estimation for JVT," JVT-G016, 12 pp. (Mar. 2003).

Deng et al., "Fast Mode Decision Algorithm for Inter-Layer Intra Prediction in SVC," *IEEE Int'l Conf. on Broadband Network and Multimedia Technology*, pp. 212-216 (Oct. 2011).

Ding et al., "Enable Efficient Compound Image Compression in H.264/AVC Intra Coding," *IEEE Int'l Conf. on Image Processing*, vol. 2, pp. 337-340 (Sep. 2007).

Do et al., "An Early Block Type Decision Method for Intra Prediction in H.264/AVC," IEEE Workshop on Signal Processing Systems, pp. 97-101 (Oct. 2009).

Flynn et al., "High Efficiency Video Coding (HEVC) Range Extensions text specification: Draft 6," JCTVC-P1005_v1, 355 pp. (Jan. 2014).

Gabriellini et al., "Adaptive Transform Skipping for Improved Coding of Motion Compensated Residuals," BBC Research & Development White Paper, WHP 246, 22 pp. (Mar. 2013).

Gan et al., "Novel Multi-frame Fast Motion Search Algorithm Based on H.264," *Journal on Communications*, vol. 28, No. 1, pp. 17-21 (Jan. 2007).

"How VP9 Works, Technical Details & Diagrams," downloaded from the World Wide Web, 12 pp. (document marked Oct. 2013).

Hsu et al., "Fast Coding Unit Decision Algorithm for HEVC," *Signal and Information Processing Association Annual Summit and Conf.*, 5 pp. (Oct. 2013).

Hu et al., "Analysis and Optimization of x265 Encoder," *IEEE Visual Communications and Image Processing Conf.*, pp. 502-505 (Dec. 2014).

(56) References Cited

OTHER PUBLICATIONS

Hu et al., "Fast Inter-Mode Decision Based on Rate-Distortion Cost Characteristics," *Proc. of the Advances in Multimedia Information Processing and 11th Pacific Rim Conf. on Multimedia*, pp. 145-155 (Sep. 2010).
International Search Report and Written Opinion dated Jan. 5, 2017, from International Patent Application No. PCT/US2016/035951, 22 pp.
Jiang et al., "Gradient Based Fast Mode Decision Algorithm for Intra Prediction in HEVC," *Int'l Conf. on Consumer Electronics, Communications and Networks*, pp. 1836-1840 (Jan. 2012).
Kibeya et al., "A Fast Coding Algorithm Based on Fast Mode Decision for HEVC Standard," *IEEE Int'l Conf. on Sciences and Techniques of Automatic Control & Computer Engineering*, pp. 158-163 (Dec. 2013).
Kim et al., "A Fast Intra Mode Skip Decision Algorithm Based on Adaptive Motion Vector Map," *Digest of Technical Papers Int'l Conf. on Consumer Electronics*, 2 pp. (Jan. 2009).
Kim et al., "A Fast Intra Mode Skip Decision Algorithm Based on Adaptive Motion Vector Map," *IEEE Trans. On Consumer Electronics*, vol. 55, No. 1, pp. 179-184 (Feb. 2009).
Kim et al., "A Fast Intra Skip Detection Algorithm for H.264/AVC Video Encoding," *ETRI Journal*, vol. 28, No. 6, pp. 721-731 (Dec. 2006).
Kim et al., "An Efficient and Fast Block Size Decision Exploiting Boundary Information of Inner Block for H.264/AVC Intra Prediction," *IEEE Southwest Symp. On Image Analysis and Interpretation*, pp. 101-104 (Mar. 2008).
Kim et al., "Block Partitioning Structure in the HEVC Standard," IEEE Trans. On Circuits and Systems for Video Technology, vol. 22, No. 12, pp. 1697-1706 (Dec. 2012).
Kim et al., "Efficient Intra-mode Decision Algorithm for Inter-frames in H.264/AVC Video Coding," *IET Image Processing*, vol. 5, No. 3, pp. 286-295 (Apr. 2011).
Kim et al., "Fast Intra/Inter Mode Decision for H.264 Encoding Using a Risk-Minimization Criterion," *SPIE Proc., Applications of Digital Image Process*, vol. 5558, 11 pp. (Nov. 2004).
Kim et al., "Fast Skip Mode Decision with Rate-Distortion Optimization for High Efficiency Video Coding," *IEEE Int'l Conf. on Multimedia and Expo Workshops*, 6 pp. (Jul. 2014).
Kim et al., "TE9-1 Report on Performance Tests for Different CTU and TU Sizes," JCTVC-0067, 13 pp. (Oct. 2010).
Lan et al., "Compress Compound Images in H.264/MPEG-4 AVC by Exploiting Spatial Correlation," *IEEE Trans. on Image Processing*, vol. 19, No. 4, pp. 946-957 (Apr. 2010).
Lan et al., "Intra Transform Skipping," JCTVC-I0408, 11 pp. (May 2012).
Lee et al., "Early Termination of Transform Skip Mode for High Efficiency Video Coding," *Int'l Conf. on Communications, Signal Processing and Computers*, pp. 177-181 (Feb. 2014).
Lee et al., "Fast Direct Mode Decision Algorithm Based on Optimal Mode Pattern Searching," *Int'l Journal of Multimedia and Ubiquitous Engineering*, vol. 7, No. 2, pp. 415-420 (Apr. 2012).
Lei et al., "Fast Intra Prediction Mode Decision for High Efficiency Video Coding," *Int'l Symp. on Computer, Communication, Control and Automation*, pp. 34-37 (Nov. 2013).
Li et al., "Description of Screen Content Coding Technology Proposal by Microsoft," JCTVC-Q0035, 27 pp. (Mar. 2014).
Li et al., "Low Complexity Encoders for JCTVC-Q0035," JCTVC-Q0052, 4 pp. (Mar. 2014).
Liang et al., "A Light-Weight HEVC Encoder for Image Coding," *Visual Communications and Image Processing*, 5 pp. (Nov. 2013).
Liao et al., "Rate-Distortion Cost Estimation for H.264/AVC," *IEEE Trans. on Circuits and Systems for Video Technology*, vol. 20, No. 1, pp. 38-49 (Jan. 2010).
Lin et al., "CE6 Subset 5.2.2 and 6.2.2: Intra Coding Improvements," JCTVC-H0057, 6 pp. (Feb. 2012).
Lin et al., "Fast Mode Decision for H.264 Based on Rate-Distortion Cost Estimation," *IEEE Int'l Conf. on Acoustics, Speech and Signal Processing*, vol. 1, 4 pp. (Apr. 2007).

Ma et al., "Rate Distortion Cost Modeling of Skip Mode and Early Skip Mode Selection for H.264," *SPIE Proc., Visual Communications and Image Processing*, vol. 7257, 4 pp. (Jan. 2009).
Mrak et al., "Improving Screen Content Coding in HEVC by Transform Skipping," *20th European Signal Processing Conf.*, pp. 1209-1213 (Aug. 2012).
Nguyen et al., "Performance Analysis of HEVC-based Intra Coding for Still Image Compression," *Picture Coding Symposium*, pp. 233-236 (May 2012).
Pan et al., "Content Adaptive Frame Skipping for Low Bit Rate Video Coding," *Int'l Conf. on Information, Communications and Signal Processing*, pp. 230-234 (Dec. 2003).
Panusopone et al., "Evaluation of RQT in HM and Related TU Representation," JCTVC-E365, 9 pp. (Mar. 2011).
Panusopone et al., "Evaluation of RQT in HM and Related TU Representation," JCTVC-E365 slideshow, 9 pp. (Mar. 2011).
Piao et al., "Encoder Improvement of Unified Intra Prediction," JCTVC-C207, 5 pp. (Oct. 2010).
Rhee et al., "A Survey of Fast Mode Decision Algorithms for Inter-Prediction and Their Applications to High Efficiency Video Coding," *IEEE Trans. on Consumer Electronics*, vol. 58, No. 4, pp. 1375-1383 (Nov. 2012).
Richardson et al., "Fast H.264 Skip Mode Selection Using an Estimation Framework," *Proc. of Picture Coding Symp.*, 5 pp. (Apr. 2006).
Shen et al., "Adaptive Transform Size Decision Algorithm for High-Efficiency Video Coding Inter Coding," *Journal of Electronic Imaging*, vol. 23, Issue 4, 9 pp. (Aug. 2014).
Shen et al., "CU Splitting Early Termination Based on Weighted SVM," *EURASIP Journal on Image and Video Processing*, 8 pp. (Jan. 2013).
Shen et al., "Effective CU Size Decision for HEVC Intracoding," *IEEE Trans. on Image Processing*, vol. 23, No. 10, pp. 4232-4241 (Oct. 2014).
Smith, "Ooh! Aah! Google Images Presents a Nicer Way to Surf the Visual Web," 4 pp., downloaded from http://googleblog.blogspot.com/2010/07/ooh-ahh-google-images-presents-nicer.html (Jul. 20, 2010).
Sun et al., "An Efficient Multi-Frame Dynamic Search Range Motion Estimation for H.264," *Visual Communications and Image Processing*, vol. 6508, 10 pp. (Jan. 2007).
Tabatabai et al., "Core Experiment 6: Intra Prediction Improvement," JCTVC-D606_rl, 13 pp. (Jan. 2011).
Tagliasacchi et al., "Hash-Based Motion Modeling in Wyner-Ziv Video Coding," *IEEE Int'l Conf. on Acoustics, Speec and Signal Processing*, vol. 1, pp. 509-512 (Apr. 2007).
Teng et al., "Fast Mode Decision Algorithm for Residual Quadtree Coding in HEVC," *IEEE Visual Communications and Image Processing*, 4 pp. (Nov. 2011).
Tian et al., "Content Adaptive Prediction Unit Size Decision Algorithm for HEVC Intra Coding," *Picture Coding Symp.*, 4 pp. (May 2012).
U et al., "An Early Intra Mode Skipping Technique for Inter Frame Coding in H.264 BP," *Digest of Technical Papers, Int'l Conf. on Consumer Electronic*, 2 pp. (Jan. 2007).
Wang et al., "An Efficient Infra Skip Decision Algorithm for H.264/AVC Video Coding," *Journal of Applied Science and Engineering*, vol. 17, No. 3, pp. 329-339 (May 2014).
Wang et al., "An Efficient Mode Decision Algorithm for H.264/AVC Encoding Optimization," *IEEE Trans. on Multimedia*, vol. 9, No. 4, pp. 882-888 (Jun. 2007).
Wang et al., "An Effective TU Size Decision Method for Fast HEVC Encoders," *Int'l Symp. on Computer, Consumer and Control*, 4 pp. (Jun. 2014).
Wang et al., "Prediction of Zero Quantized DCT Coefficients in H.264/AVC Using Hadamard Transformed Information," *IEEE Trans. on Circuits and Systems for Video Technology*, vol. 18, No. 4, pp. 510-515 (Apr. 2008).
Wei et al., "A Fast Macroblock Mode Decision Algorithm for H.264," *IEEE Asia Pacific Conf. on Circuits and Systems*, pp. 772-775 (Dec. 2006).

(56) References Cited

OTHER PUBLICATIONS

Wiegand et al., "Draft ITU-T Recommendation and Final Draft International Standard of Joint Video Specification (ITU-T Rec. H.264 | ISO/IEC 14496-10 AVC)," JVT-G050r1, 269 pp. (May 2003).

Won et al., "Transform Skip Based on Minimum TU Size," JCTVC-N0167, 10 pp. (Aug. 2013).

Xin et al., "Fast Inter Prediction Block Mode Decision Approach for H.264/AVC Based on All-Zero Blocks Detection," *IEEE Conf. on Industrial Electronics and Applications*, pp. 896-899 (Jun. 2013).

Yu et al., "Early Termination of Coding Unit Splitting for HEVC," *Asia-Pacific Signal & Information Processing Association Annual Summit and Conf.*, 4 pp. (Dec. 2012).

Zhang et al., "Early Termination Schemes for Fast Intra Mode Decision in High Efficiency Video Coding," *IEEE Int'l Symp. on Circuits and Systems*, pp. 45-48 (May 2013).

Zhang et al., "Fast Intra Prediction for High Efficiency Video Coding," *Proc. 13th Pacific Rim Conf. on Advances in Multimedia Information Processing*, 10 pp. (Dec. 2012).

Zhang et al., "Improved Intra Prediction Mode-decision Method," *Visual Communications and Image Processing*, vol. 5960, pp. 632-646 (Jul. 2005).

Zhao et al., "Further Encoder Improvement of Intra Mode Decision," JCTVC-D283, 4 pp. (Jan. 2011).

Zhao et al., "Further Encoder Improvement of Intra Mode Decision," JCTVC-D283 slideshow, 14 pp. (Jan. 2011).

BenHajyoussef et al., "Fast Gradient Based Intra Mode Decision for High Efficiency Video Coding," *Int'l Journal of Emerging Trends& Technology in Computer Science*, vol. 3, Issue 3, pp. 223-228 (May 2014).

Fritts et al., "Fast Intra-Prediction Mode Selection for H.264," Powerpoint, presentation, downloaded from the World Wide Web, 23 pp. (downloaded on Apr. 17, 2015—document not dated).

Khan et al., "Fast Hierarchical Intra Angular Mode Selection for High Efficiency Video Coding," *Proc. Int'l Conf. on Image Processing*, 5 pp. (Oct. 2014).

Kim et al., "Fast Intra Mode Decision of HEVC Based on Hierarchical Structure," *Proc. $8^{th}$ Int'l Conf. on Information, Communications, and Signal Processing*, 4 pp. (Dec. 2011).

Sharabayko et al., "Research on H.265/HEVC Intra Prediction Modes Selection Frequencies," *Int'l Conf. for Students and Young Scientists*, 3 pp. (Apr. 2014).

Vanam, "Motion Estimation and Intra Frame Prediction in H.264/AVC Encoder," Powerpoint presentation, downloaded from the World Wide Web, 31 pp. (Nov. 2013).

Kim et al., "Fast Coding Unit Size Decision Algorithm for Intra Coding in HEVC," *IEEE Int'l Conf. on Consumer Electronics*, pp. 637-638 (Jan. 2013).

Shen et al., "Fast Coding Unit Size Selection for HEVC based on Bayesian Decision Rule," *Picture Coding Symp.*, pp. 453-456 (May 2012).

Shen et al., "Fast CU Size Decision and Mode Decision Algorithm for HEVC Intra Coding," *IEEE Trans. On Consumer Electronics*, vol. 59, No. 1, pp. 207-213 (Feb. 2013).

Written Opinion dated Jul. 21, 2017, from International Patent Application No. PCT/US2016/035951, 9 pp.

International Preliminary Report on Patentability dated Sep. 27, 2017, from International Patent Application No. PCT/US2016/035951, 12 pp.

\* cited by examiner software 180 implementing one or more innovations for search strategies for intra-picture prediction modes ("IPPMs")

FIG. 5    IPPMs (500) that are considered in search
strategies in example implementations
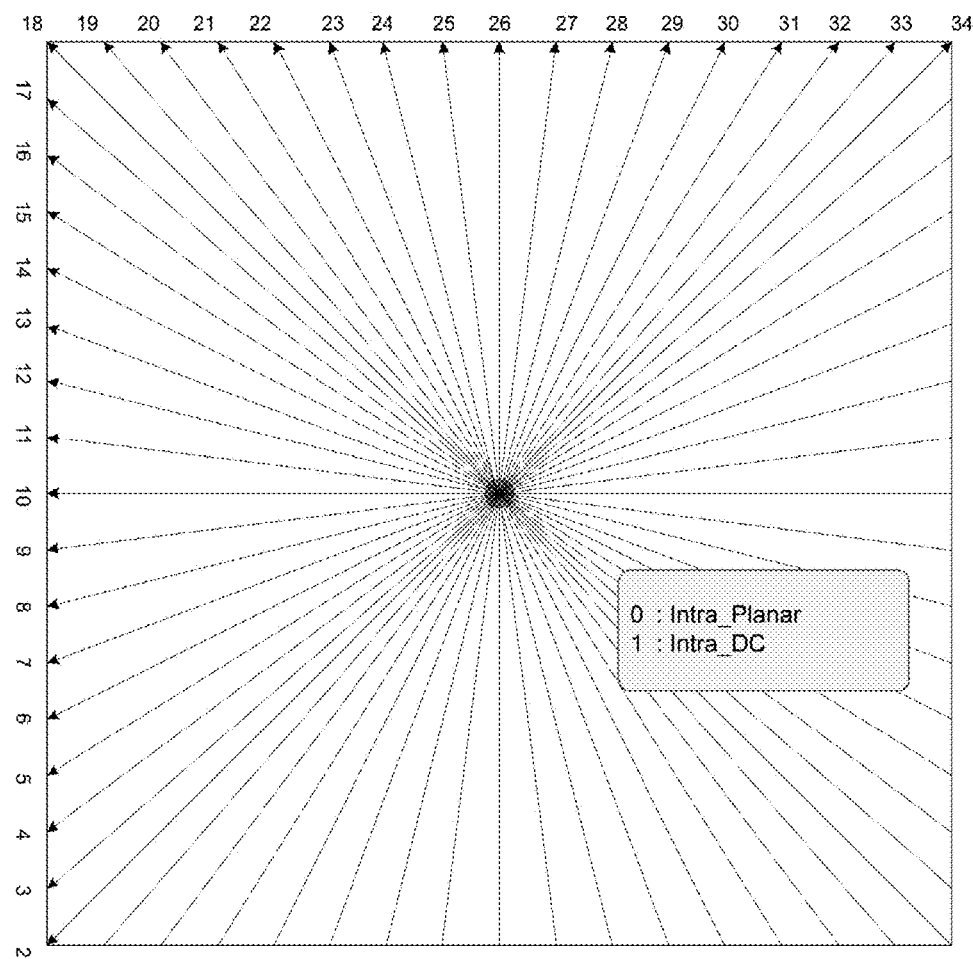

IPPMs for chroma blocks
in example implementations

1600

| intra_chroma_pred_mode[ xCb ][ yCb ] | IntraPredModeY[ xCb ][ yCb ] | | | | |
|---|---|---|---|---|---|
| | 0 | 26 | 10 | 1 | X ( 0 <= X <= 34 ) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

SEARCH STRATEGIES FOR INTRA-PICTURE PREDICTION MODES

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats define other options for the syntax of an encoded video bitstream and corresponding decoding operations.

As new video codec standards and formats have been developed, the number of coding tools available to a video encoder has steadily grown, and the number of options to evaluate during encoding for values of parameters, modes, settings, etc. has also grown. At the same time, consumers have demanded improvements in temporal resolution (e.g., frame rate), spatial resolution (e.g., frame dimensions), and quality of video that is encoded. As a result of these factors, video encoding according to current video codec standards and formats is very computationally intensive. Despite improvements in computer hardware, video encoding remains time-consuming and resource-intensive in many encoding scenarios. In particular, in many cases, evaluation of options for intra-picture prediction during video encoding can be time-consuming and resource-intensive.

SUMMARY

In summary, the detailed description presents innovations that can reduce the computational complexity of video encoding by selectively skipping certain evaluation stages during intra-picture prediction. For example, a video encoder receives a current picture of a video sequence and encodes the current picture. As part of the encoding, for a current block of the current picture, the video encoder evaluates at least some of multiple intra-picture prediction modes ("IPPMs"). According to a search strategy, the video encoder selectively skips time-consuming evaluation of certain IPPMs for the current block when those IPPMs are not expected to improve the rate-distortion performance of encoding for the current block (e.g., by lowering bit rate and/or improving quality), which can dramatically speed up the encoding process.

According to one aspect of the innovations described herein, for a first example search strategy, the video encoder checks one or more conditions and, upon satisfaction of the condition(s), performs a gradient search among angular modes of the multiple IPPMs. The gradient search typically finds a suitable angular IPPM but is computationally intensive. Depending on the condition(s), the video encoder can limit use of the gradient search to situations in which the gradient search is very likely to improve the rate-distortion performance of encoding, which tends to speed up video encoding with little or no penalty to rate-distortion performance.

According to another aspect of the innovations described herein, for a second example search strategy, the video encoder evaluates one or more of the multiple IPPMs. Then, the video encoder compares a cost of encoding the current block using motion compensation to a threshold. Depending at least in part on results of the comparing, the video encoder skips evaluation of at least some remaining IPPMs among the multiple IPPMs. In this way, when encoding of the current block using motion compensation already provides good rate-distortion performance, the video encoder can skip time-consuming, exhaustive evaluation of IPPMs.

According to another aspect of the innovations described herein, for a third example search strategy, the video encoder identifies an anchor angular IPPM among the multiple IPPMs, which have a range of angular IPPMs. The video encoder also identifies multiple new angular IPPMs, where the anchor angular IPPM and multiple new angular IPPMs are, at least approximately, evenly spread throughout the range of angular IPPMs. The video encoder evaluates each of the multiple new angular IPPMs. In this way, to find the starting angular IPPM for a gradient search, the video encoder can evaluate diverse options within the range of angular IPPMs.

According to another aspect of the innovations described herein, for an example search strategy when the current block is a block of chroma sample values, the video encoder evaluates, in a first stage, an IPPM selected for a corresponding block of luma sample values. Depending on results of the first-stage evaluation, in a second stage, the video encoder evaluates one or more other IPPMs possible for the current block. Then, depending on results of the second-stage evaluation, in a third stage, the video encoder evaluates one or more remaining IPPMs possible for the current block. In many cases, by prioritizing the IPPM selected for the corresponding block of luma sample values, and by de-prioritizing the time-consuming, remaining IPPM(s), the video encoder can speed up video encoding with little or no penalty to rate-distortion performance.

The innovations can be implemented as part of a method, as part of a computing system configured to perform the method or as part of a tangible computer-readable media storing computer-executable instructions for causing a computing system to perform the method. The various innovations can be used in combination or separately. For example, in some implementations, a video encoder incorporates the first, second, and third search strategies, as well as the search strategy for blocks of chroma sample values. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 5 is a diagram illustrating example intra-picture prediction modes ("IPPMs") in some described embodiments.

FIG. 16 is a table illustrating IPPMs for blocks of chroma sample values in some described embodiments.

DETAILED DESCRIPTION

The detailed description presents innovations in video encoding that can reduce computational complexity by selectively skipping certain evaluation stages during intra-picture prediction. For example, a video encoder receives a current picture of a video sequence and encodes the current picture. As part of the encoding, for a current block of the current picture, the video encoder evaluates at least some of multiple intra-picture prediction modes ("IPPMs"). According to a search strategy, however, the video encoder selectively skips time-consuming evaluation of certain IPPMs for the current block when those IPPMs are not expected to improve rate-distortion performance of encoding for the current block (e.g., by lowering bit rate and/or improving quality). Selectively skipping evaluation of IPPMs can dramatically speed up encoding.

Some of the innovations described herein are illustrated with reference to terms and IPPMs specific to the H.265/ HEVC standard. The innovations described herein can also be implemented for other standards or formats (e.g., the VP9 format, H.264/AVC standard).

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

Figure 1:
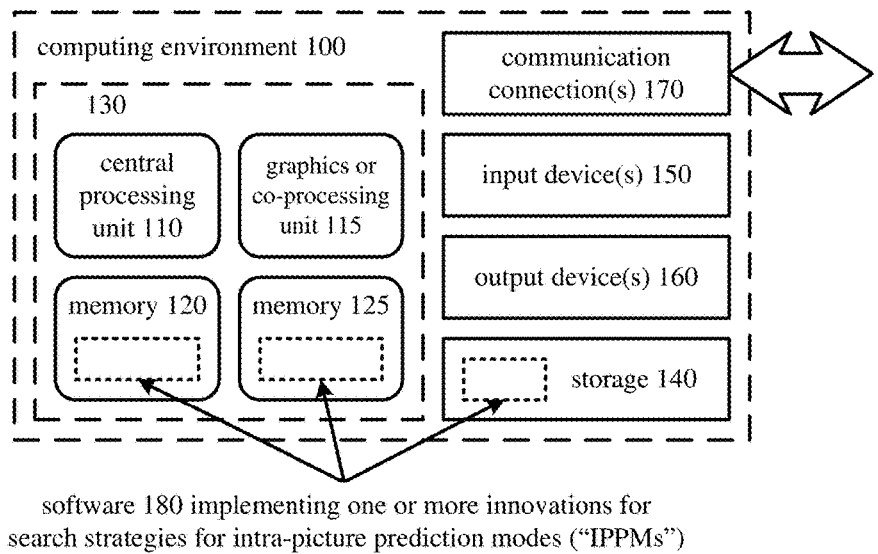
FIG. 1 is a diagram illustrating an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for search strategies for IPPMs, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, optical media such as CD-ROMs or DVDs, or any other medium which can be used to store information and which can be accessed within the computing system (100).

The storage (140) stores instructions for the software (180) implementing one or more innovations for search strategies for IPPMs.

The input device(s) (150) may be a touch input device such as a keyboard, mouse, pen, or trackball, a voice input device, a scanning device, or another device that provides input to the computing system (100). For video, the input device(s) (150) may be a camera, video card, screen capture module, TV tuner card, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "evaluate" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
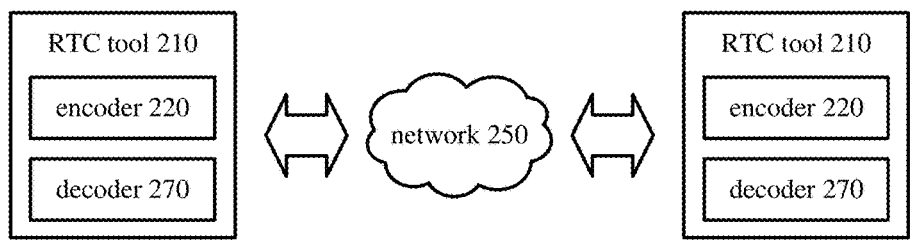
FIGS. 2a and 2b are diagrams illustrating example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the H.265/HEVC standard, SMPTE 421M standard, ISO/IEC 14496-10 standard (also known as H.264/AVC), another standard, or a proprietary format such as VP8 or VP9, or a variation or extension of one of those standards or formats, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
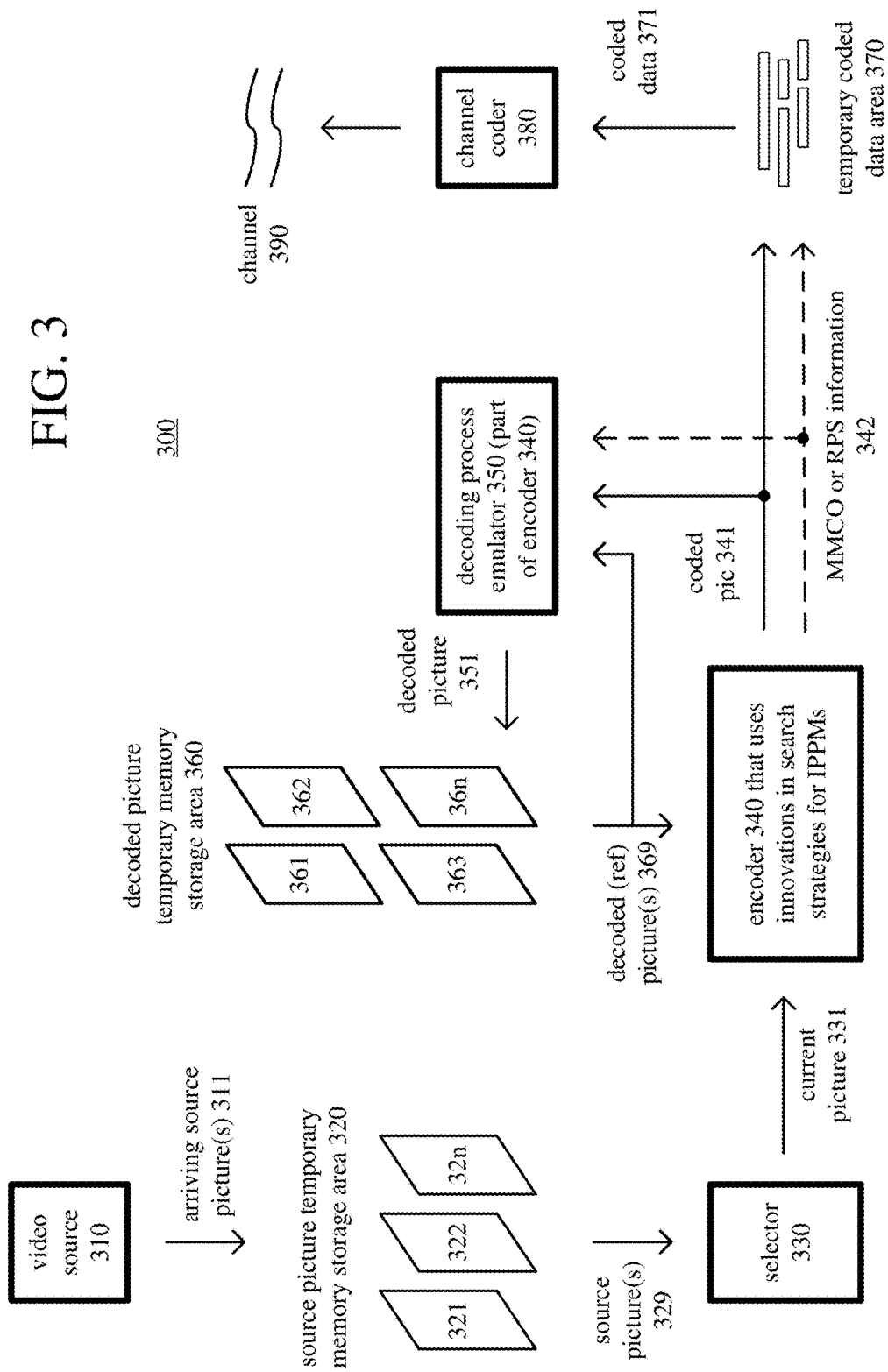
FIG. 3 is a diagram illustrating an example video encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270).

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). A playback tool (214) can include client-side controller logic for managing connections with the encoding tool (212).

III. Example Encoder Systems

FIG. 3 shows an example video encoder system (300) in conjunction with which some described embodiments may be implemented. The video encoder system (300) includes a video encoder (340), which is further detailed in FIGS. 4a and 4b.

The video encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The video encoder system (300) can be adapted for encoding of a particular type of content. The video encoder system (300) can be implemented as part of an operating system module, as part of an application library, as part of a standalone application, or using special-purpose hardware. Overall, the video encoder system (300) receives a sequence of source video pictures (311) from a video source (310) and produces encoded data as output to a channel (390). The encoded data output to the channel can include content encoded using one or more of the innovations described herein.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320) to encode as the current picture (331). The order in which pictures are selected by the picture selector (330) for input to the video encoder (340) may differ from the order in which the pictures are produced by the video source (310), e.g., the encoding of some pictures may be delayed in order, so as to allow some later pictures to be encoded first and to thus facilitate temporally backward prediction. Before the video encoder (340), the video encoder system (300) can include a pre-processor (not shown) that performs pre-processing (e.g., filtering) of the current picture (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Thus, before encoding, video may be converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for a YUV 4:2:0 format or YUV 4:2:2 format), or the chroma sample values may have the same resolution as the luma sample values (e.g., for a YUV 4:4:4 format). Alternatively, video can be organized according to another format (e.g., RGB 4:4:4 format, GBR 4:4:4 format or BGR 4:4:4 format).

Figure 4A:
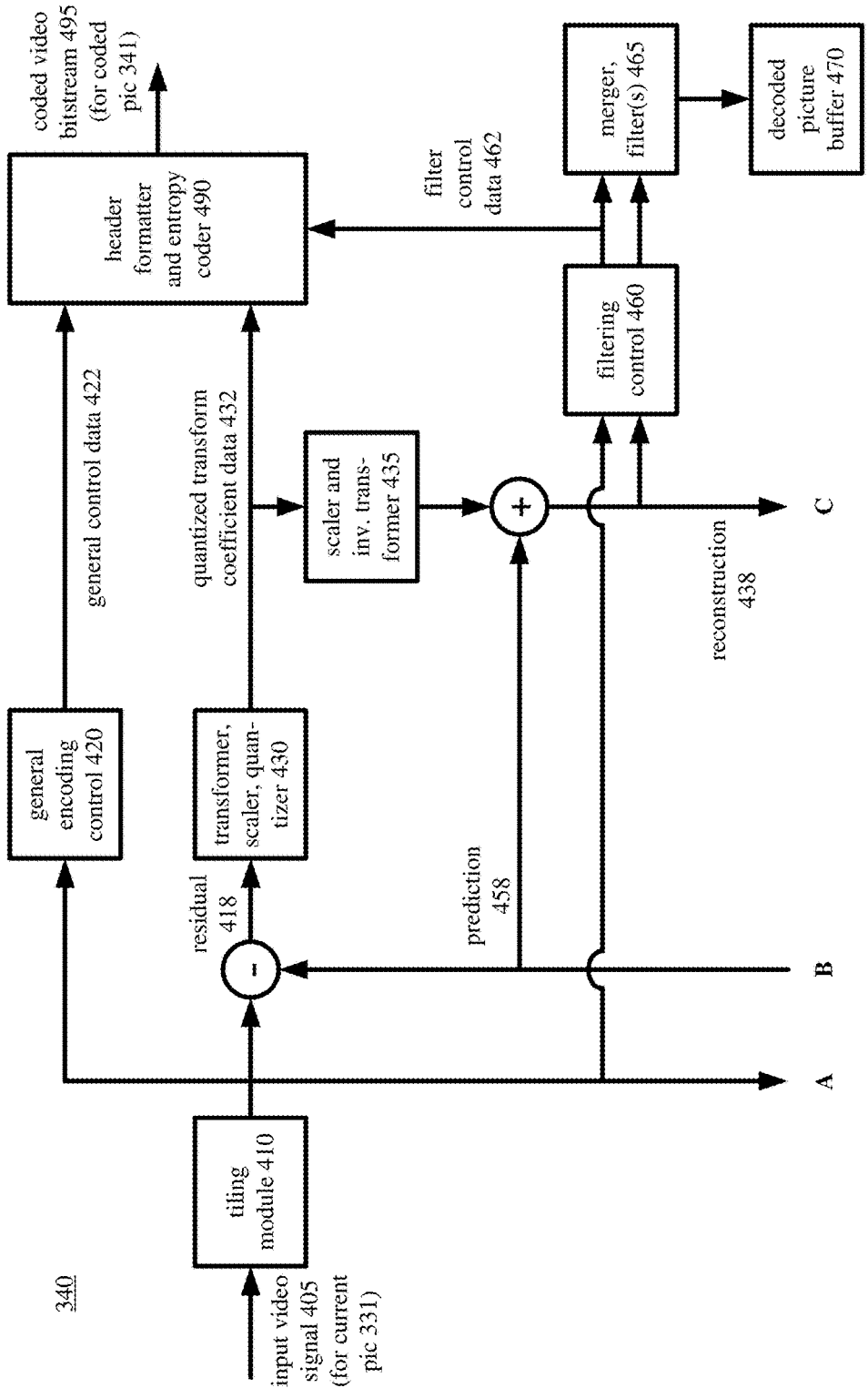
FIGS. 4a and 4b are diagrams illustrating an example video encoder in conjunction with which some described embodiments can be implemented.
Figure 4B:
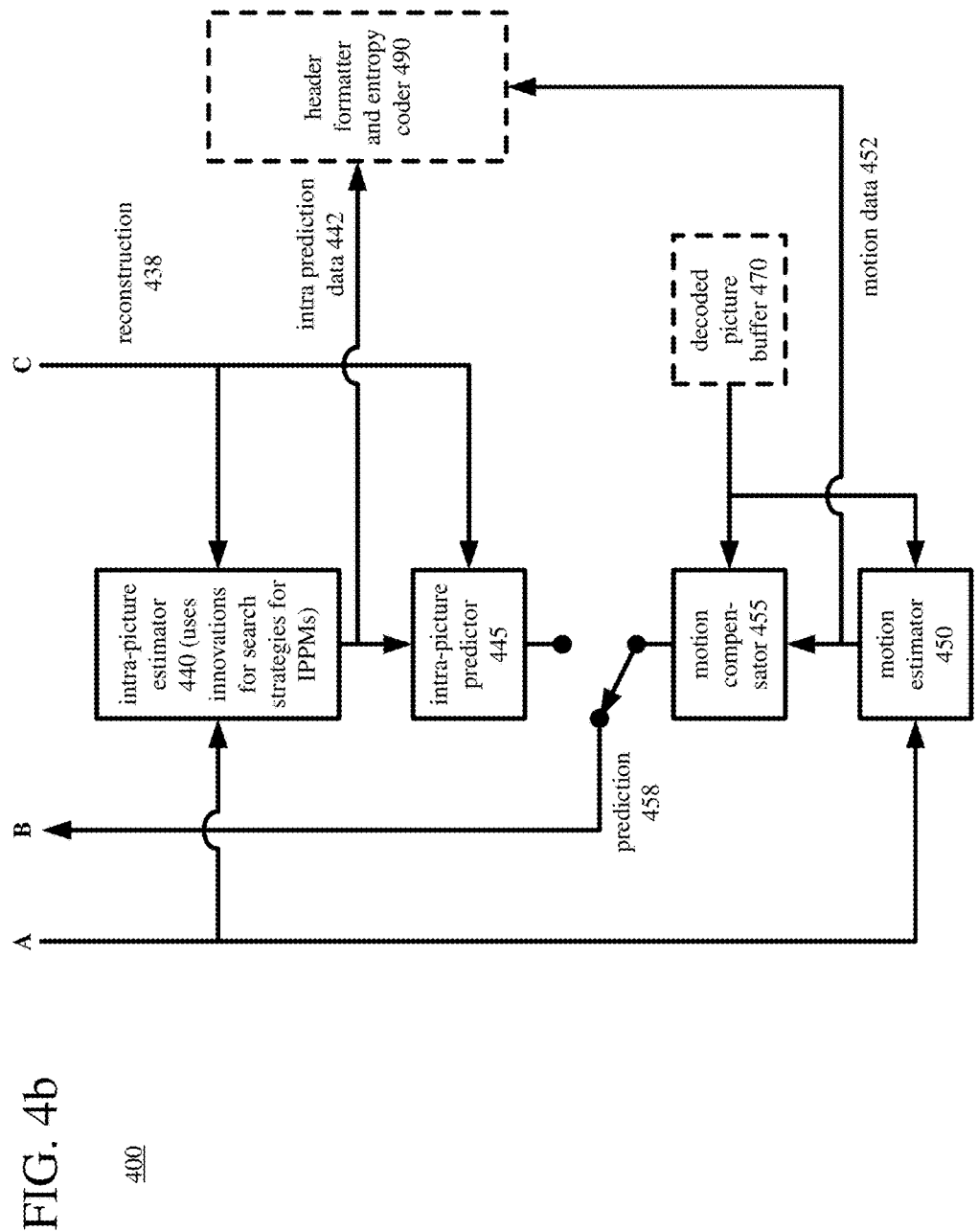

The video encoder (340) encodes the current picture (331) to produce a coded picture (341). As shown in FIGS. 4a and 4b, the video encoder (340) receives the current picture (331) as an input video signal (405) and produces encoded data for the coded picture (341) in a coded video bitstream (495) as output.

Generally, the video encoder (340) includes multiple encoding modules that perform encoding tasks such as partitioning into tiles, intra-picture prediction estimation and prediction, motion estimation and compensation, frequency transforms, quantization, and entropy coding. Many of the components of the video encoder (340) are used for both intra-picture coding and inter-picture coding. The exact operations performed by the video encoder (340) can vary depending on compression format and can also vary depending on encoder-optional implementation decisions. The format of the output encoded data can be Windows Media Video format, VC-1 format, MPEG-x format (e.g., MPEG-1, MPEG-2, or MPEG-4), H.26x format (e.g., H.261, H.262, H.263, H.264, H.265), VPx format, a variation or extension of one of the preceding standards or formats, or another format.

As shown in FIG. 4a, the video encoder (340) can include a tiling module (410). With the tiling module (410), the video encoder (340) can partition a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding. Blocks may be further sub-divided at different stages, e.g., at the prediction, frequency transform and/or entropy encoding stages. For example, a picture can be divided into 64×64 blocks, 32×32 blocks, or 16×16 blocks, which can in turn be divided into smaller blocks of sample values for coding and decoding.

For syntax according to the H.264/AVC standard, the video encoder (340) can partition a picture into one or more slices of the same size or different sizes. The video encoder (340) splits the content of a picture (or slice) into 16×16 macroblocks. A macroblock includes luma sample values organized as four 8×8 luma blocks and corresponding chroma sample values organized as 8×8 chroma blocks. Generally, a macroblock has a prediction mode such as inter or intra. A macroblock includes one or more prediction units (e.g., 8×8 blocks, 4×4 blocks, which may be called partitions for inter-picture prediction) for purposes of signaling of prediction information (such as prediction mode details, motion vector ("MV") information, etc.) and/or prediction processing. A macroblock also has one or more residual data units for purposes of residual coding/decoding.

For syntax according to the H.265/HEVC standard, the video encoder (340) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-picture-predicted CU, the PU has the same size as the CU, unless the CU has the smallest size (e.g., 8×8). In that case, the CU can be split into smaller PUs (e.g., four 4×4 PUs if the smallest CU size is 8×8, for intra-picture prediction) or the PU can have the smallest CU size, as indicated by a syntax element for the CU. For an inter-picture-predicted CU, the CU can have one, two, or four PUs, where splitting into four PUs is allowed only if the CU has the smallest allowable size.

In H.265/HEVC implementations, a CU also has one or more transform units for purposes of residual coding/decoding, where a transform unit ("TU") has a luma transform block ("TB") and two chroma TBs. A CU may contain a single TU (equal in size to the CU) or multiple TUs. According to quadtree syntax, a TU can be split into four smaller TUs, which may in turn be split into smaller TUs according to quadtree syntax. The video encoder decides how to partition video into CTUs (CTBs), CUs (CBs), PUs (PBs) and TUs (TBs).

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, residual data unit, CTB, CB, PB or TB, or some other set of sample values, depending on context. The term "unit" can indicate a macroblock, CTU, CU, PU, TU or some other set of blocks, or it can indicate a single block, depending on context.

As shown in FIG. 4a, the video encoder (340) includes a general encoding control (420), which receives the input video signal (405) for the current picture (331) as well as feedback (not shown) from various modules of the video encoder (340). Overall, the general encoding control (420) provides control signals (not shown) to other modules, such as the tiling module (410), transformer/scaler/quantizer (430), scaler/inverse transformer (435), intra-picture prediction estimator (440), motion estimator (450) and intra/inter switch, to set and change coding parameters during encoding. The general encoding control (420) can evaluate intermediate results during encoding, typically considering bit rate costs and/or distortion costs for different options. In particular, the general encoding control (420) decides whether to use intra-picture prediction or inter-picture prediction for the units of the current picture (331). Also, as described in the next section, the general encoding control (420) can help the intra-picture prediction estimator (440) evaluate IPPMs for blocks, according to one or more of the search strategies described herein. In many situations, the general encoding control (420) (working with the intra-picture prediction estimator (440)) can help the video encoder (340) avoid time-consuming evaluation of IPPMs for a block when such IPPMs are unlikely to improve rate-distortion performance during encoding for that block, which tends to speed up encoding. The general encoding control (420) produces general control data (422) that indicates decisions made during encoding, so that a corresponding decoder can make consistent decisions. The general control data (422) is provided to the header formatter/entropy coder (490).

With reference to FIG. 4b, if a unit the current picture (331) is predicted using inter-picture prediction, a motion estimator (450) estimates the motion of blocks of sample values of the unit with respect to one or more reference pictures. The current picture (331) can be entirely or partially coded using inter-picture prediction. When multiple reference pictures are used, the multiple reference pictures can be from different temporal directions or the same temporal direction. The motion estimator (450) potentially evaluates candidate MVs in a contextual motion mode as well as other candidate MVs. For contextual motion mode, as candidate MVs for the unit, the motion estimator (450) evaluates one or more MVs that were used in motion compensation for certain neighboring units in a local neighborhood or one or more MVs derived by rules. The candidate MVs for contextual motion mode can include MVs from spatially adjacent units, MVs from temporally adjacent units, and MVs derived by rules. Merge mode in the H.265/HEVC standard is an example of contextual motion mode. In some cases, a contextual motion mode can involve a competition among multiple derived MVs and selection of one of the multiple derived MVs. The motion estimator (450) can evaluate different partition patterns for motion compensation for partitions of a given unit of the current picture (331) (e.g., 2N×2N, 2N×N, N×2N, or N×N partitions for PUs of a CU in the H.265/HEVC standard).

The decoded picture buffer (470), which is an example of decoded picture temporary memory storage area (360) as shown in FIG. 3, buffers one or more reconstructed previously coded pictures for use as reference pictures. The motion estimator (450) produces motion data (452) as side information. In particular, the motion data (452) can include information that indicates whether contextual motion mode (e.g., merge mode in the H.265/HEVC standard) is used and, if so, the candidate MV for contextual motion mode (e.g., merge mode index value in the H.265/HEVC standard). More generally, the motion data (452) can include MV data and reference picture selection data. The motion data (452) is provided to the header formatter/entropy coder (490) as well as the motion compensator (455). The motion compensator (455) applies MV(s) for a block to the reconstructed reference picture(s) from the decoded picture buffer (470). For the block, the motion compensator (455) produces a motion-compensated prediction, which is a region of sample values in the reference picture(s) that are used to generate motion-compensated prediction values for the block.

With reference to FIG. 4b, if a unit of the current picture (331) is predicted using intra-picture prediction, an intra-picture prediction estimator (440) determines how to perform intra-picture prediction for blocks of sample values of the unit. The current picture (331) can be entirely or partially coded using intra-picture prediction. Using values of a reconstruction (438) of the current picture (331), for intra spatial prediction, the intra-picture prediction estimator (440) determines how to spatially predict sample values of a block of the current picture (331) from neighboring, previously reconstructed sample values of the current picture (331), e.g., estimating extrapolation of the neighboring reconstructed sample values into the block. Examples of intra-picture prediction modes ("IPPMs") are described below. In particular, the intra-picture prediction estimator (440) can evaluate IPPMs using one or more of the search strategies described in the next section, or some other search strategy. As side information, the intra-picture prediction estimator (440) produces intra prediction data (442), such as information indicating whether intra prediction uses spatial prediction and, if so, the IPPM used. The intra prediction data (442) is provided to the header formatter/entropy coder (490) as well as the intra-picture predictor (445). According to the intra prediction data (442), the intra-picture predictor (445) spatially predicts sample values of a block of the current picture (331) from neighboring, previously reconstructed sample values of the current picture (331), producing intra-picture prediction values for the block.

As shown in FIG. 4b, the intra/inter switch selects whether the predictions (458) for a given unit will be motion-compensated predictions or intra-picture predictions. Intra/inter switch decisions for units of the current picture (331) can be made using various criteria.

The video encoder (340) can determine whether or not to encode and transmit the differences (if any) between a block's prediction values (intra or inter) and corresponding original values. The differences (if any) between a block of the prediction (458) and a corresponding part of the original current picture (331) of the input video signal (405) provide values of the residual (418). If encoded/transmitted, the values of the residual (418) are encoded using a frequency transform (if the frequency transform is not skipped), quantization, and entropy encoding. In some cases, no residual is calculated for a unit. Instead, residual coding is skipped, and the predicted sample values are used as the reconstructed sample values. The decision about whether to skip residual coding can be made on a unit-by-unit basis (e.g., CU-by-CU basis in the H.265/HEVC standard) for some types of units (e.g., only inter-picture-coded units) or all types of units.

With reference to FIG. 4a, when values of the residual (418) are encoded, in the transformer/scaler/quantizer (430), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of values of the residual (418) (or sample value data if the prediction (458) is null), producing blocks of frequency transform coefficients. The transformer/scaler/quantizer (430) can apply a transform with variable block sizes. In this case, the transformer/scaler/quantizer (430) can determine which block sizes of transforms to use for the residual values for a current block. For example, in H.265/HEVC implementations, the transformer/scaler/quantizer (430) can split a TU by quadtree decomposition into four smaller TUs, each of which may in turn be split into four smaller TUs, down to a minimum TU size. TU size can be 32×32, 16×16, 8×8, or 4×4 (referring to the size of the luma TB in the TU).

In H.265/HEVC implementations, the frequency transform can be skipped. In this case, values of the residual (418) can be quantized and entropy coded. In particular, transform skip mode may be useful when encoding screen content video, but usually is not especially useful when encoding other types of video.

With reference to FIG. 4a, in the transformer/scaler/quantizer (430), a scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantization step size can depend on a quantization parameter ("QP"), whose value is set for a picture, tile, slice, and/or other portion of video. The quantized transform coefficient data (432) is provided to the header formatter/entropy coder (490). If the frequency transform is skipped, the scaler/quantizer can scale and quantize the blocks of prediction residual data (or sample value data if the prediction (458) is null), producing quantized values that are provided to the header formatter/entropy coder (490). When quantizing transform coefficients, the video encoder (340) can use rate-distortion-optimized quantization ("RDOQ"), which is very time-consuming, or apply simpler quantization rules.

As shown in FIGS. 4a and 4b, the header formatter/entropy coder (490) formats and/or entropy codes the general control data (422), quantized transform coefficient data (432), intra prediction data (442), motion data (452), and filter control data (462). The entropy coder of the video encoder (340) compresses quantized transform coefficient values as well as certain side information (e.g., MV information, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

The video encoder (340) produces encoded data for the coded picture (341) in an elementary bitstream, such as the coded video bitstream (495) shown in FIG. 4a. In FIG. 4a, the header formatter/entropy coder (490) provides the encoded data in the coded video bitstream (495). The syntax of the elementary bitstream is typically defined in a codec standard or format, or extension or variation thereof. For example, the format of the coded video bitstream (495) can be a Windows Media Video format, VC-1 format, MPEG-x format (e.g., MPEG-1, MPEG-2, or MPEG-4), H.26x format (e.g., H.261, H.262, H.263, H.264, H.265), VPx format, a variation or extension of one of the preceding standards or formats, or another format. After output from the video encoder (340), the elementary bitstream is typically packetized or organized in a container format, as explained below.

The encoded data in the elementary bitstream includes syntax elements organized as syntax structures. In general, a syntax element can be any element of data, and a syntax structure is zero or more syntax elements in the elementary bitstream in a specified order. In the H.264/AVC standard and H.265/HEVC standard, a NAL unit is a syntax structure that contains (1) an indication of the type of data to follow and (2) a series of zero or more bytes of the data. For example, a NAL unit can contain encoded data for a slice (coded slice). The size of the NAL unit (in bytes) is indicated outside the NAL unit. Coded slice NAL units and certain other defined types of NAL units are termed video coding layer ("VCL") NAL units. An access unit is a set of one or more NAL units, in consecutive decoding order, containing the encoded data for the slice(s) of a picture, and possibly containing other associated data such as metadata.

For syntax according to the H.264/AVC standard or H.265/HEVC standard, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.264/AVC standard or H.265/HEVC standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

As shown in FIG. 3, the video encoder (340) also produces memory management control operation ("MMCO") signals (342) or reference picture set ("RPS") information. The RPS is the set of pictures that may be used for reference in motion compensation for a current picture or any subsequent picture. If the current picture (331) is not the first picture that has been encoded, when performing its encoding process, the video encoder (340) may use one or more previously encoded/decoded pictures (369) that have been stored in a decoded picture temporary memory storage area (360). Such stored decoded pictures (369) are used as reference pictures for inter-picture prediction of the content of the current picture (331). The MMCO/RPS information (342) indicates to a video decoder which reconstructed pictures may be used as reference pictures, and hence should be stored in a picture storage area.

With reference to FIG. 3, the coded picture (341) and MMCO/RPS information (342) (or information equivalent to the MMCO/RPS information (342), since the dependencies and ordering structures for pictures are already known at the video encoder (340)) are processed by a decoding process emulator (350). The decoding process emulator (350) implements some of the functionality of a video decoder, for example, decoding tasks to reconstruct reference pictures. In a manner consistent with the MMCO/RPS information (342), the decoding process emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a video decoder that receives the coded picture (341) and produces a corresponding decoded picture (351). In doing so, when the video encoder (340) has used decoded picture(s) (369) that have been stored in the decoded picture storage area (360), the decoding process emulator (350) also uses the decoded picture(s) (369) from the storage area (360) as part of the decoding process.

The decoding process emulator (350) may be implemented as part of the video encoder (340). For example, the decoding process emulator (350) includes modules and logic as shown in FIGS. 4a and 4b. During reconstruction of the current picture (331), when values of the residual (418) have been encoded/signaled, reconstructed residual values are combined with the prediction (458) to produce an approximate or exact reconstruction (438) of the original content from the video signal (405) for the current picture (331). (In lossy compression, some information is lost from the video signal (405).)

To reconstruct residual values, in the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the video encoder (340) combines reconstructed residual values with values of the prediction (458) (e.g., motion-compensated prediction values, intra-picture prediction values) to form the reconstruction (438). When residual values have not been encoded/signaled, the video encoder (340) uses the values of the prediction (458) as the reconstruction (438).

For intra-picture prediction, the values of the reconstruction (438) can be fed back to the intra-picture prediction estimator (440) and intra-picture predictor (445). The values of the reconstruction (438) can be used for motion-compensated prediction of subsequent pictures. The values of the reconstruction (438) can be further filtered. A filtering control (460) determines how to perform deblock filtering and sample adaptive offset ("SAO") filtering on values of the reconstruction (438), for the current picture (331). The filtering control (460) produces filter control data (462), which is provided to the header formatter/entropy coder (490) and merger/filter(s) (465).

In the merger/filter(s) (465), the video encoder (340) merges content from different tiles into a reconstructed version of the current picture. The video encoder (340) selectively performs deblock filtering and SAO filtering according to the filter control data (462) and rules for filter adaptation, so as to adaptively smooth discontinuities across boundaries in the current picture (331). Other filtering (such as de-ringing filtering or adaptive loop filtering ("ALF"); not shown) can alternatively or additionally be applied. Tile boundaries can be selectively filtered or not filtered at all, depending on settings of the video encoder (340), and the video encoder (340) may provide syntax elements within the coded bitstream to indicate whether or not such filtering was applied.

In FIGS. 4a and 4b, the decoded picture buffer (470) buffers the reconstructed current picture for use in subsequent motion-compensated prediction. More generally, as shown in FIG. 3, the decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the video encoder (340) for use as reference pictures. After modeling the decoding process, the decoding process emulator (350) stores a newly decoded picture (351) in a picture buffer (361, 362, etc.) that has been identified in this manner.

As shown in FIG. 3, the coded picture (341) and MMCO/RPS information (342) are buffered in a temporary coded data area (370). The coded data that is aggregated in the coded data area (370) contains, as part of the syntax of the elementary bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.01ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

Depending on implementation and the type of compression desired, modules of the video encoder system (300) and/or video encoder (340) can be added, omitted, split into multiple modules, combined with other modules, and/or replaced with like modules. In alternative embodiments, encoder systems or encoders with different modules and/or other configurations of modules perform one or more of the described techniques. Specific embodiments of encoder systems typically use a variation or supplemented version of the video encoder system (300). Specific embodiments of video encoders typically use a variation or supplemented version of the video encoder (340). The relationships shown between modules within the video encoder system (300) and video encoder (340) indicate general flows of information in the video encoder system (300) and video encoder (340), respectively; other relationships are not shown for the sake of simplicity.

IV. Search Strategies for Evaluation of Intra-Picture Prediction Modes

This section presents examples of search strategies for evaluation of intra-picture prediction modes ("IPPMs") during video encoding. In many cases, during encoding of a block, a video encoder can avoid evaluation of IPPMs when those IPPMs are unlikely to improve rate-distortion performance for the block, which tends to speed up encoding with little or no penalty to rate-distortion performance.

Different search strategies described in this section use different approaches. For many of the search strategies, however, a common theme is identifying situations in which the expected benefits of IPPMs justify the computational cost of evaluating those IPPMs. Considering its potential "return on investment," a video encoder can evaluate IPPMs when use of those IPPMs is sufficiently likely to improve rate-distortion performance.

A. Example IPPMs

FIG. 5 shows examples of IPPMs (500) according to the H.265/HEVC standard. The IPPMs (500) include a DC prediction mode (IPPM 1), which uses an average value of neighboring reference sample values, and a planar prediction mode (IPPM 0), which uses average values of two linear predictions (based on corner reference samples). The DC prediction mode (IPPM 1) and planar prediction mode (IPPM 0) are non-angular IPPMs. The IPPMs (500) also include 33 angular IPPMs (IPPMs 2-34), which use extrapolation from neighboring reference sample values in different directions, as shown in FIG. 5. Different IPPMs (500) may yield different intra-picture prediction values. Typically, a video encoder evaluates intra-picture prediction values for an intra-picture-coded block according to one or more of the IPPMs (500) in order to identify one of the IPPMs (500) that provides effective encoding.

Alternatively, a video encoder evaluates other and/or additional IPPMs. For example, the video encoder evaluates one or more of the IPPMs specified for the H.264/AVC standard, VP8 format, or VP9 format.

Depending on the IPPM, computing intra-picture prediction values can be relatively simple (as in IPPMs 10 and 26) or more complicated. One picture can include tens of thousands of blocks. Collectively, evaluating all of the IPPMs for the blocks of a picture, or even evaluating a subset of the IPPMs for the blocks, can be computationally intensive. In particular, the cost of evaluating IPPMs for blocks may be prohibitive for real time video encoding. Therefore, in some examples described herein, a video encoder selectively skips evaluation of some IPPMs according to one or more example search strategies.

In some examples described herein, a video encoder evaluates one or more most probable modes ("MPMs") among the IPPMs possible for a current block. The MPM(s) can include IPPMs used to encode spatially adjacent blocks, IPPMs used to encode temporally adjacent blocks, and/or IPPMs derived by rules. Typically, a standard or format specifies the process by which a video encoder (and, during video decoding, a video decoder) determines the MPM(s) for the current block. For example, the H.265/HEVC standard specifies a process of determining three MPMs for a current block based on (1) the IPPM, if any, used to encode a spatially adjacent block above the current block, (2) the IPPM, if any, used to encode a spatially adjacent block to the left of the current block, and (3) rules for completing the set of three MPMs (e.g., avoiding redundant occurrences of IPPMs in the MPMs, adding IPPMS based on values of other MPMs). According to the H.265/HEVC standard, the MPMs for a block include at least one angular IPPM. Alternatively, MPMs are defined in some other way. In any case, when selected for intra-picture prediction for a block, use of one of the MPM(s) can be efficiently signaled in the bitstream.

B. Example Encoding Framework for Search Strategies and Example Encoders

Figure 6:
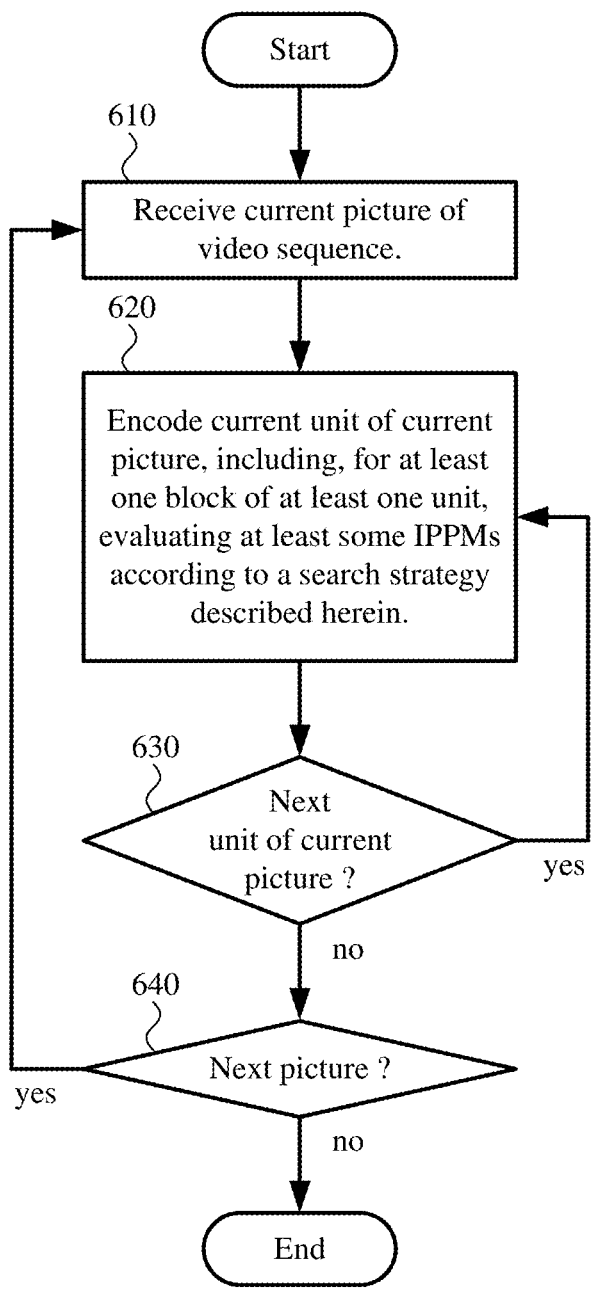
FIG. 6 is a flowchart illustrating a generalized technique for encoding units of pictures, including, for at least one block of at least one unit, evaluating IPPMs according to a search strategy described herein.

FIG. 6 illustrates a generalized technique (600) for encoding units of pictures of a video sequence, including, for at least one block of at least one unit, evaluating IPPMs according to an example search strategy described herein. A video encoder as described with reference to FIGS. 3, 4a, and 4b, or other video encoder, performs the technique (600).

The video encoder receives (610) a picture of a video sequence, which is handled as the "current picture" of the video sequence. The video encoder then encodes the current picture on a unit-by-unit basis (e.g., macroblock-by-macroblock basis for H.264/AVC encoding, CU-by-CU basis for H.265/HEVC encoding, possibly within slices on a slice-by-slice basis, or within tiles on a tile-by-tile basis). For a given unit ("current unit") of the current picture, the video encoder encodes (620) the current unit and checks (630) whether to continue with encoding of the next unit of the current picture. If so, the video encoder encodes (620) the next unit as the current unit of the current picture. Otherwise (no more units to encode in the current picture), the video encoder checks (640) whether to continue with encoding of the next picture in the video sequence. If so, the video encoder receives (610) the next picture (as the current picture) and encodes it.

As part of the encoding, for at least one block of at least one unit, the video encoder evaluates at least some IPPMs according to one or more of the example search strategies described herein. The different example search strategies can be used individually. Or, the different example search strategies can be used in combination. For example, a video encoder can use the first example search strategy with the second example search strategy, third example search strategy, and/or fourth example search strategy. Or, as another example, a video encoder can use the second example search strategy with the third example search strategy and/or fourth example search strategy. Or, as another example, a video encoder can use the third example search strategy with the fourth example search strategy.

With reference to the video encoder system (300) shown in FIG. 3 and video encoder (340) shown in FIGS. 4a and 4b, a video encoder system that incorporates one of the example search strategies described herein includes at least a buffer (not shown), encoding control (420), and intra-picture prediction estimator (440). The buffer is configured to store a current picture of a video sequence. Using the encoding control (420) and intra-picture prediction estimator (440), the video encoder (340) is configured to receive and encode the current picture, including, for a current block of the current picture, evaluating at least some of multiple IPPMs according to a search strategy. Details of various example search strategies are provided below. For at least the first example search strategy and some variations of the example second search strategy, the video encoder (340) is also configured to use a motion estimator (450) to evaluate options for motion compensation of the current block.

In various stages, a video encoder can compute a cost of encoding a block or unit using inter-picture prediction ($cost_{inter}$) or compute a cost of encoding the block or unit using intra-picture prediction ($cost_{intra}$). The way that inter-picture prediction cost information $cost_{inter}$ and intra-picture prediction cost information cost intra are computed depends on implementation. For example, the inter-picture prediction cost information $cost_{inter}$ can be a rate-distortion cost for a given block or unit: $cost_{inter}=D_{inter}+\lambda \cdot R_{inter}$, where $D_{inter}$ is a distortion component that quantifies the coding error for motion-compensated prediction residual values for the given block or unit, $R_{inter}$ is a rate component that quantifies bitrate for the one or more MVs for the given block or unit and/or the motion-compensated prediction residual values for the given block or unit, and $\lambda$ is a weighting factor. Similarly, the intra-picture prediction cost information $cost_{intra}$ can be a rate-distortion cost for a given block or unit: $cost_{intra}=D_{intra}+\lambda \cdot R_{intra}$, where $D_{intra}$ is a distortion component that quantifies the coding error for intra-picture prediction residual values for the given block or unit, $R_{intra}$ is a rate component that quantifies bitrate for the one or more IPPMs for the given block or unit and/or the intra-picture prediction residual values for the given block or unit, and $\lambda$ is a weighting factor. The distortion components $D_{inter}$ and $D_{intra}$ can be computed using sum of absolute differences ("SAD"), sum of squared differences ("SSD"), sum of absolute transform differences ("SATD"), or some other measure. The rate components $R_{inter}$ and $R_{intra}$ can be computed using estimates of rates or actual bit counts (after frequency transform, quantization, and/or entropy coding, as applicable). Alternatively, the inter-picture prediction cost information $cost_{inter}$ and intra-picture prediction cost information $cost_{intra}$ are computed in some other way.

In some example implementations, the video encoder varies how the distortion components and rate components are computed for the inter-picture prediction cost information $cost_{inter}$ and intra-picture prediction cost information $cost_{intra}$ depending on available processing resources (e.g., CPU budget). For example, if processing resources are scarce, the video encoder uses SAD for the distortion components and uses estimates for the rate components. On the other hand, if processing resources are not scarce, the video encoder uses SSD for the distortion components and uses actual bit counts for the rate components. The value of the weighting factor $\lambda$ can change depending on how the distortion components and rate components are computed.

C. First Example Search Strategy

Figure 7:
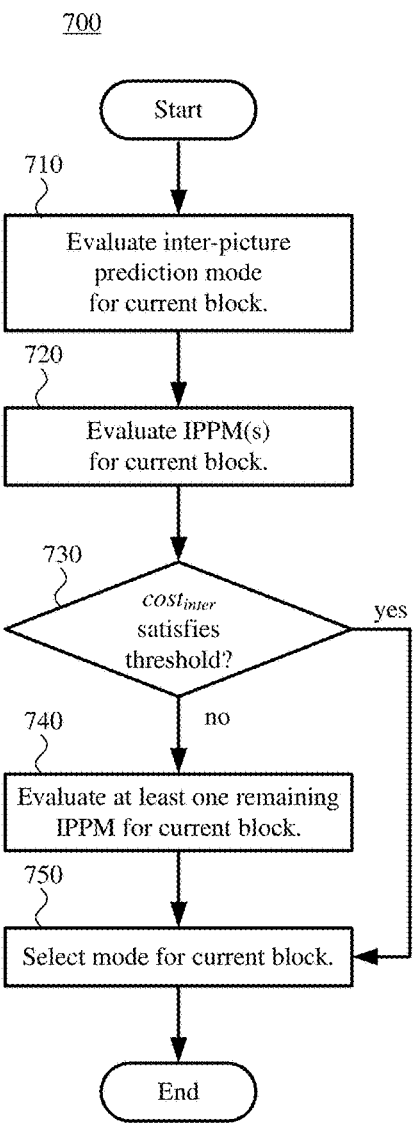
FIG. 7 is a flowchart illustrating a first example search strategy when evaluating IPPMs for a current block, according to which a video encoder skips evaluation of some IPPMs when inter-picture prediction is successful.

FIG. 7 illustrates a first example search strategy (700) when evaluating IPPMs for a current block (e.g., block of luma sample values), according to which a video encoder skips evaluation of some IPPMs when inter-picture prediction is successful. For example, the video encoder can use the cost of inter-picture prediction as an exit condition during the search for IPPMs, helping the video encoder decide when to skip evaluation of most probable modes ("MPMs") of the IPPMs or decide when to skip a gradient search process for angular IPPMs.

With reference to FIG. 7, the video encoder evaluates (710) an inter-picture prediction mode for the current block. The video encoder also evaluates (720) one or more of the multiple IPPMs for the block. The video encoder checks (730) whether a cost of encoding the current block using motion compensation ($cost_{inter}$) satisfies a threshold. For example, the video encoder compares $cost_{inter}$ to the threshold to determine whether $cost_{inter}$ is less than the threshold (or, alternatively, less than or equal to the threshold). The value of the threshold depends on implementation, and generally represents a level of very good quality encoding.

Depending at least in part on results of the checking (730), the video encoder skips evaluation of at least some remaining IPPMs among the multiple IPPMs. For example, if $cost_{inter}$ satisfies the threshold, the video encoder skips evaluation of one or more MPMs and/or skips performance of a gradient search process for angular IPPMs. On the other hand, if $cost_{inter}$ does not satisfy the threshold, as shown in FIG. 7, the video encoder (740) evaluates at least one remaining IPPM for the current block and selects (750) a prediction mode for the current block (e.g., selecting the inter-picture prediction mode or one of the evaluated IPPMs). In this case, the remaining IPPM(s) that are evaluated can include one or more MPMs among the IPPMs and/or angular IPPMs evaluated in a gradient search process.

D. Second Example Search Strategy

Figure 8:
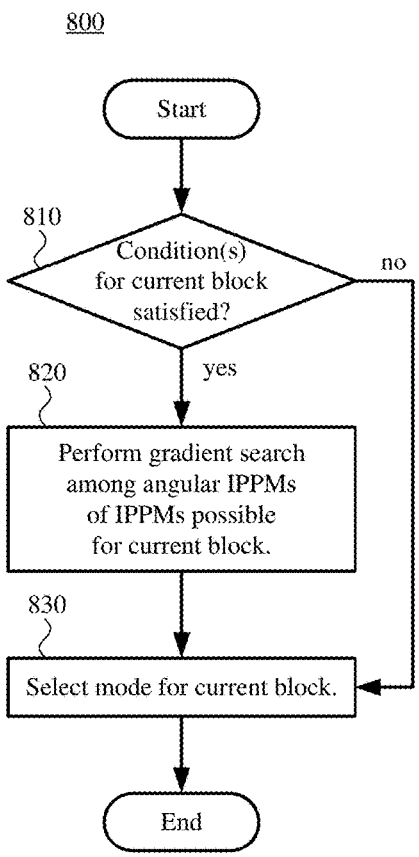
FIG. 8 is a flowchart illustrating a second example search strategy when evaluating IPPMs for a current block, according to which a video encoder conditionally performs a gradient search.

FIG. 8 illustrates a second example search strategy (800) when evaluating IPPMs for a current block (e.g., block of luma sample values), according to which a video encoder conditionally performs a gradient search. For example, the video encoder checks one or more conditions under which a gradient search process for angular IPPMs usually fails to improve performance, helping the video encoder decide when to skip the gradient search process.

With reference to FIG. 8, the video encoder checks (810) whether one or more conditions for the current block are satisfied. Examples of condition(s) are described with reference to FIGS. 9, 10, and 11a-11b. Alternatively, the video encoder checks other and/or additional conditions. If the condition(s) are satisfied, the video encoder performs (820) a gradient search among angular IPPMs of the IPPMs possible for the current block. Section VI.E describes example gradient search processes. Alternatively, the video encoder performs another gradient search process. If at least one of the condition(s) is not satisfied, the video encoder skips the gradient search process. Whether or not the condition(s) are satisfied, the video encoder selects (830) a prediction mode for the current block (e.g., selecting the inter-picture prediction mode or one of the evaluated IPPMs).

1. First Variation of Second Example Search Strategy

Figure 9:
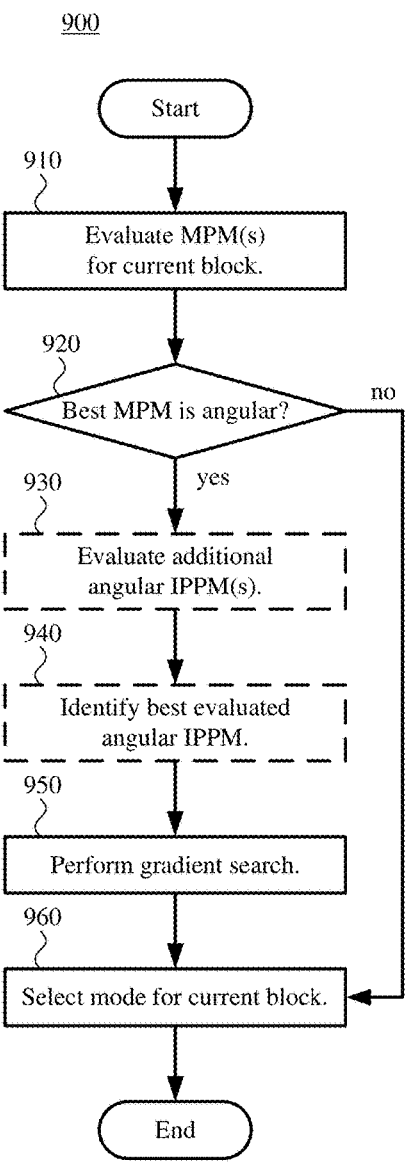
FIGS. 9, 10, and 11a-11b are flowcharts illustrating variations of the second example search strategy.

FIG. 9 shows a first variation (900) of the second example search strategy (800) when evaluating IPPMs for a current block.

The video encoder evaluates (910) one or more MPMs among the multiple IPPMs. The MPM(s) include at least one angular IPPM. For example, the video encoder evaluates three MPMs that are defined as specified in the H.265/HEVC standard. Alternatively, the video encoder evaluates other and/or additional MPMs.

The video encoder checks (920) whether a best IPPM of the MPM(s) is an angular IPPM. For example, suppose three MPMs for the current block are planar (IPPM 0), horizontal (IPPM 10), and vertical (IPPM 26). If IPPM 10 provides better performance than IPPM 0 and IPPM 26, then the best IPPM (IPPM 10) is an angular IPPM. If IPPM 0 provides better performance than IPPM 10 and IPPM 26, then the best IPPM (IPPM 0) is not an angular IPPM.

If the best IPPM of the MPM(s) is an angular IPPM, the video encoder optionally evaluates (930) one or more additional angular IPPMs among the multiple IPPMs (e.g., using the third search strategy to determine the additional angular IPPMs) and identifies (940) the best angular IPPM that has been evaluated. For example, the video encoder identifies a best angular IPPM among the MPM(s) and evaluates additional angular IPPMs that are offset from the best angular IPPM by (exactly or approximately) 45 degrees, 90 degrees, and 135 degrees (or −45 degrees). For additional details, see section IV.F. Alternatively, other angular IPPMs are identified.

The evaluation (930) of additional angular IPPM(s) adds some computational complexity to encoding of the current block. To avoid adding such computational complexity, the video encoder can selectively perform the evaluation (930) of additional angular IPPM(s) depending on various conditions. For example, the video encoder considers performance of the best MPM (e.g., skipping the evaluation (930) and identification (940) stages if the best MPM provides sufficient performance, according to some comparison of a cost measure for the best MPM to a pre-defined threshold). Or, as another example, the video encoder considers performance of an inter-picture prediction mode for the current block (e.g., skipping the evaluation (930) and identification (940) stages if the inter-picture prediction mode provides sufficient performance, according to some comparison of a cost measure for the inter-picture prediction mode to a pre-defined threshold).

The video encoder then performs (950) a gradient search, using the best MPM (if stages 930 and 940 are not performed) or best evaluated angular IPPM (if stages 930 and 940 are performed) as the starting angular IPPM for the gradient search. Thus, performance (950) of the gradient search depends at least in part on whether the best IPPM of the MPM(s) is an angular IPPM.

In any case, the video encoder selects (960) a prediction mode for the current block (e.g., selecting the inter-picture prediction mode or one of the evaluated IPPMs, whichever mode is best). If the best IPPM of the MPM(s) is not an angular IPPM ("no" branch at 920), the video encoder can select the inter-picture prediction mode or a non-angular IPPM, whichever mode is best.

2. Second Variation of Second Example Search Strategy

Figure 10:
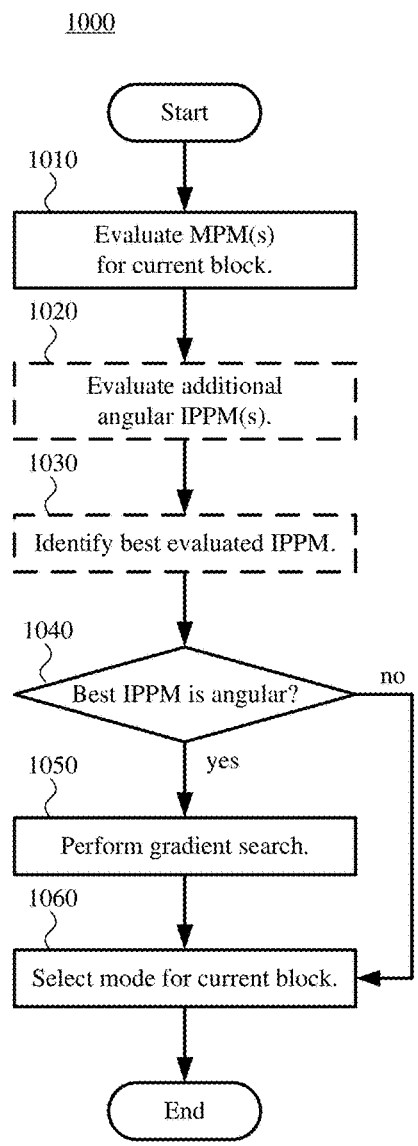

FIG. 10 shows a second variation (1000) of the second example search strategy (800) when evaluating IPPMs for a current block.

The video encoder evaluates (1010) one or more MPMs among the multiple IPPMs. The MPM(s) include at least one angular IPPM. For example, the video encoder evaluates three MPMs that are defined as specified in the H.265/HEVC standard. Alternatively, the video encoder evaluates other and/or additional MPMs.

The video encoder optionally evaluates (1020) one or more additional angular IPPMs among the multiple IPPMs (e.g., using the third search strategy to determine the additional angular IPPMs) and identifies (1030) the best IPPM among the evaluated IPPMs. For example, the video encoder identifies a best angular IPPM among the MPM(s) and evaluates additional angular IPPMs that are offset from the best angular IPPM by (exactly or approximately) 45 degrees, 90 degrees, and 135 degrees (or –45 degrees). For additional details, see section IV.F. Alternatively, other angular IPPMs are identified.

The evaluation (1020) of additional angular IPPM(s) adds some computational complexity to encoding of the current block. To avoid adding such computational complexity, the video encoder can selectively perform the evaluation (1020) of additional angular IPPM(s) depending on various conditions. For example, the video encoder considers performance of the best MPM (e.g., skipping the evaluation (1020) and identification (1030) stages if the best MPM provides sufficient performance, according to some comparison of a cost measure for the best MPM to a pre-defined threshold). Or, as another example, the video encoder considers performance of an inter-picture prediction mode for the current block (e.g., skipping the evaluation (1020) and identification (1030) stages if the inter-picture prediction mode provides sufficient performance, according to some comparison of a cost measure for the inter-picture prediction mode to a pre-defined threshold).

The video encoder checks (1040) whether the best evaluated IPPM is an angular IPPM. If so, the video encoder performs (1050) a gradient search, using the best evaluated IPPM as the starting angular IPPM for the gradient search. Thus, performance (1050) of the gradient search depends at least in part on whether the best evaluated IPPM is an angular IPPM.

In any case, the video encoder selects (1060) a prediction mode for the current block (e.g., selecting the inter-picture prediction mode or one of the evaluated IPPMs, whichever mode is best). If the best IPPM of the MPM(s) is not an angular IPPM ("no" branch at 1040), the video encoder can select the inter-picture prediction mode or a non-angular IPPM, whichever mode is best.

3. Third Variation of Second Example Search Strategy

Figure 11A:
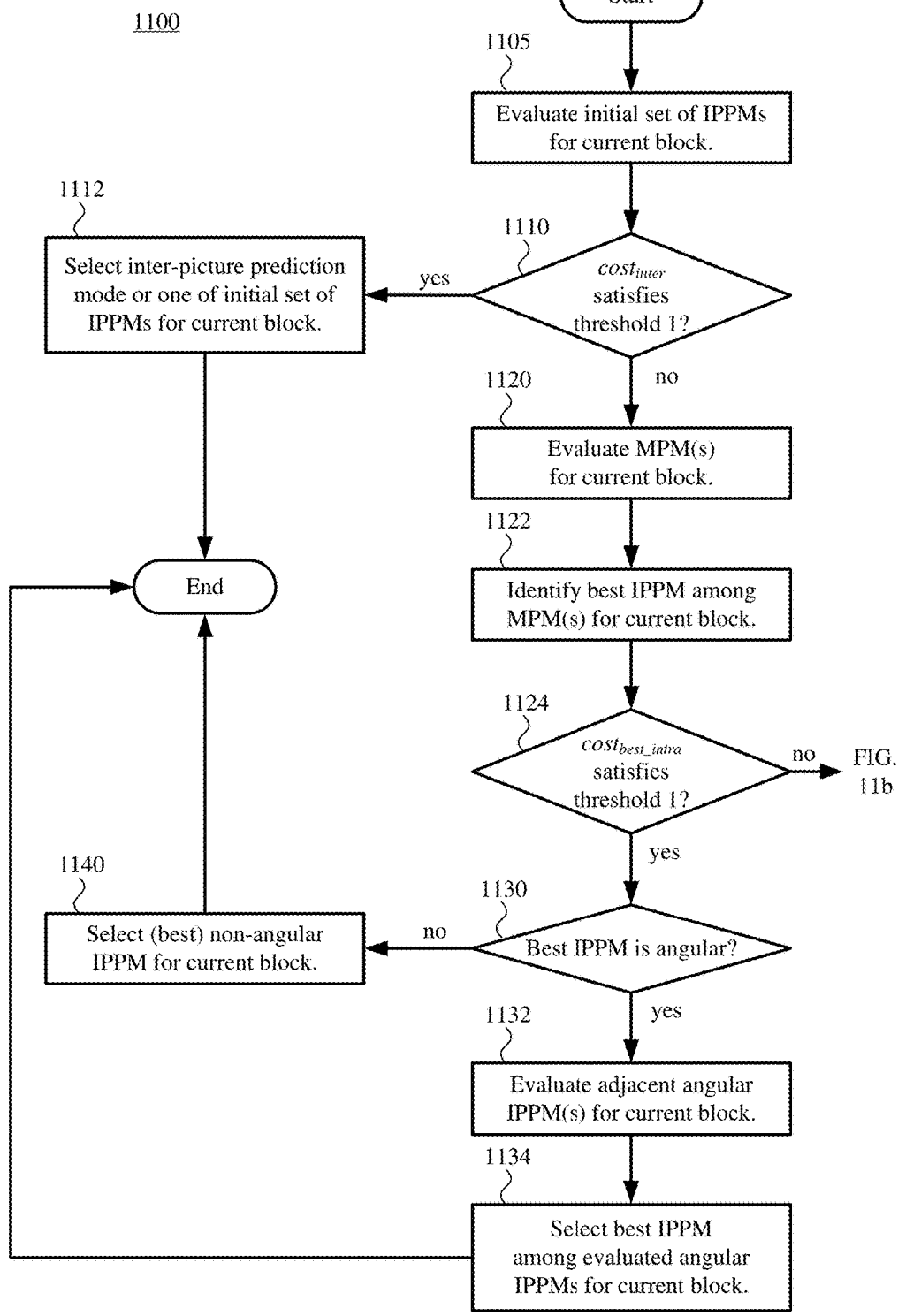
Figure 11B:
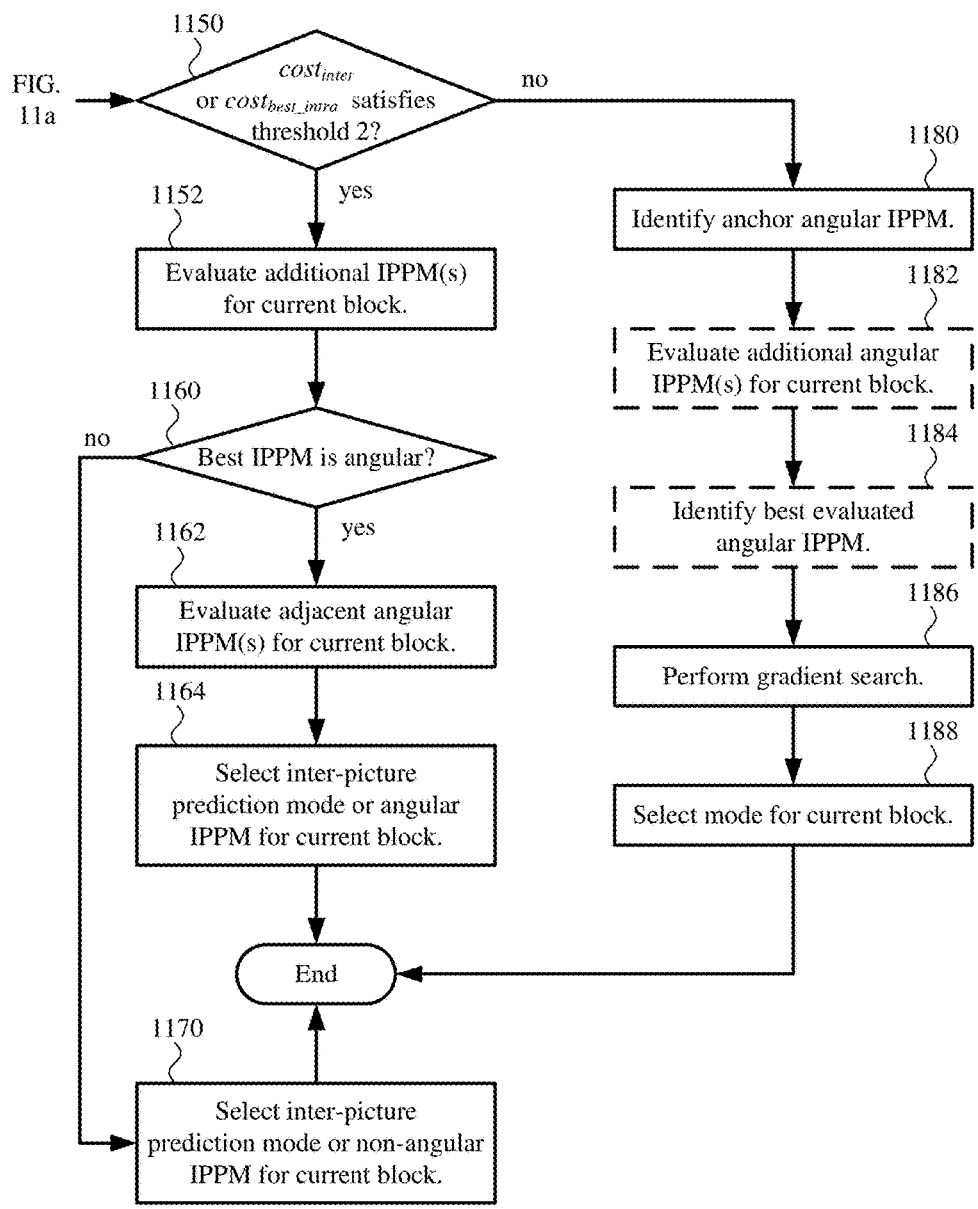

FIGS. 11a-11b show a third variation (1100) of the second example search strategy (800) when evaluating IPPMs for a current block. The third variation (1100) of the second example search strategy (800) recognizes several common cases in which the gradient search process can be skipped to reduce the computational complexity of encoding with little or no penalty to encoding quality.

Case 0.

The video encoder evaluates (1105) an initial set of IPPMs for the current block. For example, the initial set of IPPMs includes planar (IPPM 0), DC (IPPM 1), and vertical (IPPM 26), which are relatively common IPPMs and not especially complex. Alternatively, the initial set of IPPMs includes other and/or additional IPPMs that are likely to be used by the current block.

Then, the video encoder checks (1110) if the cost of encoding the current block using motion compensation ($cost_{inter}$) satisfies a first threshold, which depends on implementation. The first threshold has a value that indicates very good quality of encoding. For example, the video encoder compares $cost_{inter}$ the first threshold, which is satisfied if $cost_{inter}$ is less than the first threshold (or, alternatively, if $cost_{inter}$ is less than or equal to the first threshold). If $cost_{inter}$ satisfies the first threshold, the video encoder selects (1112) inter-picture prediction mode or one of the initial set of IPPMs for the current block, whichever mode is best. The current block is encoded using motion compensation or one of the initial set of IPPMs without performing the gradient search (and without evaluating additional IPPMs as in cases 1-3).

Thus, according to the condition checked in case 0, performance of the gradient search depends at least in part on results of comparing the cost of encoding the current block using motion compensation to the first threshold. In many cases, the only IPPMs that are evaluated are the initial set of IPPMs (e.g., IPPM 0, IPPM 1, and IPPM 26), which dramatically speeds up encoding.

Case 1.

If $cost_{inter}$ does not satisfy the first threshold ("no" branch at 1110), the video encoder might still perform the gradient search. The video encoder evaluates (1120) one or more MPMs among the multiple IPPMs and identifies (1122) a best IPPM among the MPM(s) for the current block (or, alternatively, identifies the best IPPM among IPPMs evaluated for the current block so far—the initial set of IPPMs and MPM(s)). For example, the MPM(s) are specified using any of the approaches described above.

The video encoder checks (1124) if a cost of encoding the current block using the identified best IPPM ($cost_{best\_intra}$) satisfies the first threshold. For example, the video encoder compares the cost of encoding the current block using the best evaluated IPPM to the first threshold, which is satisfied if $cost_{best\_intra}$ is less than the first threshold (or, alternatively, if $cost_{best\_intra}$ is less than or equal to the first threshold). Alternatively, the thresholds can be different at stages 1110 and 1124.

If $cost_{best\_intra}$ satisfies the first threshold, the video encoder checks (1130) if the identified best IPPM is an angular IPPM. If so, the video encoder evaluates (1132) one or more additional adjacent angular IPPMs for the current block. For example, the additional adjacent angular IPPM(s) are the angular IPPMs on each side of the identified best IPPM (if the angular IPPMs are ordered according to angular direction, e.g., as shown in FIG. 5, the adjacent angular IPPMs are the identified best IPPM+1 and identified best IPPM–1). The video encoder selects (1134) a best IPPM among the evaluated angular IPPMs for the current block. The current block is encoded using the best angular IPPM without performing the gradient search.

Otherwise (the identified best IPPM is not an angular IPPM at stage 1130), the video encoder selects (1140) the (best) non-angular IPPM for the current block. The current block is encoded using the non-angular IPPM without performing the gradient search.

Thus, according to the conditions checked in case 1, performance of the gradient search depends at least in part on results of comparing the cost of encoding the current block using the identified best IPPM to the first threshold. In many cases, the only IPPMs that are evaluated are the initial set of IPPMs, MPM(s), and (sometimes) adjacent angular IPPM(s), which speeds up encoding by avoiding the gradient search.

Case 2.

If $cost_{best\_ultra}$ does not satisfy the first threshold ("no" branch at 1124), the video encoder might still perform the gradient search. With reference to FIG. 11b, the video encoder checks (1150) if $cost_{inter}$ or $cost_{best\_intra}$ satisfies a second threshold, which depends on implementation. The second threshold, which is higher than the first threshold, has a value that indicates moderate quality of encoding. For example, the video encoder compares the lower of $cost_{inter}$ and $cost_{best\_intra}$ to the second threshold, which is satisfied if $cost_{inter}$ or $cost_{best\_intra}$ is less than the second threshold (or, alternatively, if $cost_{inter}$ or $cost_{best\_intra}$ is less than or equal to the second threshold).

If $cost_{inter}$ or $cost_{best\_intra}$ satisfies the second threshold, the video encoder evaluates (1152) one or more additional IPPMs for the current block. For example, the video encoder evaluates horizontal prediction (IPPM 10) for the current block. Alternatively, the video encoder evaluates one or more other and/or additional IPPMs at stage 1152. Then, the video encoder checks (1160) if the best IPPM evaluated so far is an angular IPPM. If so, the video encoder evaluates (1162) one or more additional adjacent angular IPPMs for the current block (e.g., as described with reference to stage 1132). The video encoder selects (1164) inter-picture prediction mode or a best angular IPPM among the evaluated angular IPPMs for the current block, whichever mode is best. The current block is encoded using the selected mode without performing the gradient search.

Otherwise (the identified best IPPM is not an angular IPPM—"no" branch at 1160), the video encoder selects (1170) inter-picture prediction mode or a best non-angular IPPM among the evaluated IPPMs for the current block, whichever mode is best. The current block is encoded using the selected mode without performing the gradient search.

Thus, according to the conditions checked in case 2, performance of the gradient search depends at least in part on results of comparing $cost_{inter}$ and/or $cost_{best\_intra}$ to the second threshold. In many cases, with the conditions checked for case 2, the video encoder can speed up encoding by skipping the gradient search.

Case 3.

If neither $cost_{inter}$ nor $cost_{best\_intra}$ satisfies the second threshold ("no" branch at 1150), the video encoder performs the gradient search. The video encoder identifies (1180) an anchor angular IPPM, optionally evaluates (1182) one or more additional angular IPPMs among the multiple IPPMs (e.g., using the third search strategy to determine the additional angular IPPM(s)), and identifies (1184) the best angular IPPM that has been evaluated. The video encoder then performs (1186) a gradient search, using the anchor angular IPPM (if stages 1182 and 1184 are not performed) or best evaluated angular IPPM (if stages 1182 and 1184 are performed) as the starting angular IPPM for the gradient search. Then, the video encoder selects (1188) a prediction mode for the current block (e.g., selecting the inter-picture prediction mode or one of the evaluated IPPMs, whichever mode is best).

As noted above, the first and second thresholds depend on implementation. In general, values of the first and second thresholds depend on how cost information is computed, in order to have an appropriate scale. Also, the first and second thresholds depend on block size, since distortion and bit rate typically vary depending on the number of sample values in a block or unit. For example, the first threshold is 1 bit per sample value, and the second threshold is 1.5 bits per sample value. Alternatively, the first and second thresholds have other values.

In the third variation (1100) of the second example search strategy (800), the video encoder can change which cases are checked in different encoding modes. For example, in a "fast" encoding mode, the video encoder checks case 0, case 1, and/or case 2 before reaching case 3. On the other hand, in a "regular" encoding mode, which is slower than the fast encoding mode but more thorough, the video encoder checks only case 3.

E. Example Gradient Search Processes

Figure 12:
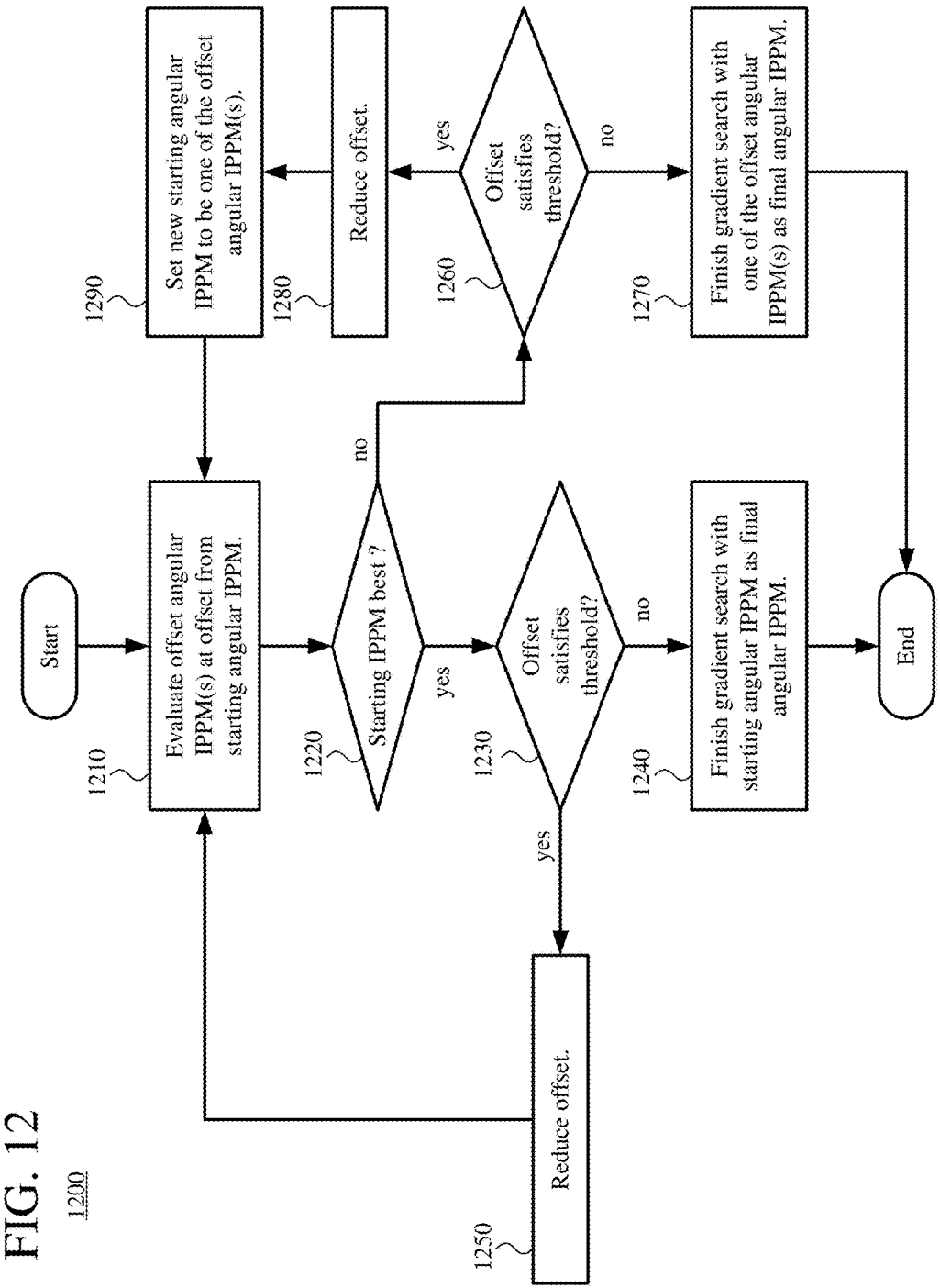
FIG. 12 is a flowchart illustrating an example gradient search process.

FIG. 12 illustrates an example gradient search process (1200). The example gradient search process (1200) is an iterative process, which begins at a starting angular IPPM.

In an iteration of the example gradient search process (1200), a video encoder evaluates (1210) one or more offset angular IPPMs, where each of the offset angular IPPM(s) is at an offset from the starting angular IPPM. For example, the angular IPPMs are ordered according to angular direction, e.g., as shown in FIG. 5, the initial value of the offset is 2, and two offset angular IPPMs are at offsets of +2 and −2 IPPMs, respectively, from the starting angular IPPM. Alternatively, the initial value of the offset if 4, 8, or some other value. In later iterations of the example gradient search process (1200), the offset has another value.

The video encoder checks (1220) if the starting angular IPPM is better than each of the offset angular IPPM(s). If so, the video encoder checks (1230) whether the current value of the offset satisfies a threshold, which defines an exit condition for the example gradient search process (1200). For example, the threshold is 1, and the video encoder checks whether the current value of the offset is greater than 1. If the current value of the offset satisfies the threshold ("yes" branch at 1230), the video encoder reduces (1250) the value of the offset (e.g., dividing the current value by 2) and continues the example gradient search process (1200) in a next iteration. On the other hand, if the current value of the offset does not satisfy the threshold ("no" branch at 1230), the video encoder finishes (1240) the example gradient search process (1200), with the starting angular IPPM providing the final angular IPPM.

Otherwise (at least one of the offset angular IPPM(s) is better than the starting angular IPPM—"no" branch at 1220), the video encoder checks (1260) whether the current value of the offset satisfies the threshold, which defines the exit condition for the example gradient search process (1200). If the current value of the offset satisfies the threshold ("yes" branch at 1260), the video encoder reduces (1280) the value of the offset (e.g., dividing the current value by 2), sets (1290) the starting angular IPPM to be the best of the offset angular IPPM(s), and continues the example gradient search process (1200) in a next iteration using the new starting angular IPPM. On the other hand, if the current value of the offset does not satisfy the threshold ("no" branch at 1260), the video encoder finishes (1270) the example gradient search process (1200), with the best of the angular IPPM(s) as the final angular IPPM.

Alternatively, when at least one of the offset angular IPPM(s) is better than the starting angular IPPM ("no" branch at 1220), and the current value of the offset satisfies the threshold ("yes" branch at 1260), the video encoder selectively maintains the current value of the offset, skipping the reducing (1280) stage. For example, the video encoder keeps the current value of the offset for at least one more iteration of the example gradient search process (1200). Or, as another example, the video encoder keeps the current value of the offset for as long as one of the offset angular IPPM(s) improves performance in an iteration, compared to the starting angular IPPM for that iteration. The video encoder can cache results from previously evaluated IPPMs, to avoid repeating evaluation of IPPMs for the current block.

F. Third Example Search Strategy

Figure 13:
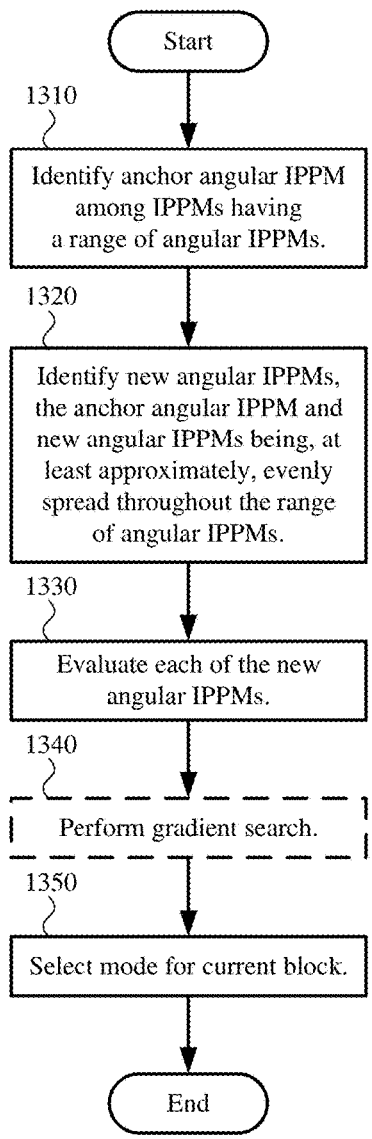
FIG. 13 is a flowchart illustrating a third example search strategy when evaluating IPPMs for a current block, according to which diverse angular IPPMS are evaluated.

FIG. 13 illustrates a third example search strategy (1300) when evaluating IPPMs for a current block (e.g., block of luma sample values), according to which diverse angular IPPMS are evaluated. For example, the video encoder can determine an angular IPPM ("anchor" angular IPPM) among MPM(s) for the current block, and then evaluate angular IPPMs that are distributed throughout the range of angular IPPMs, so that the video encoder evaluates diverse angular IPPMs before selecting a starting angular IPPM for a gradient search process.

With reference to FIG. 13, the video encoder identifies (1310) an anchor angular IPPM among the multiple IPPMs, which have a range of angular IPPMs. The anchor angular IPPM can be identified in various ways. For example, among the IPPMs, the video encoder evaluates one or more MPMs for the current block, and the anchor angular IPPM is one of the MPM(s). If there are multiple angular IPPMs among the MPM(s), the video encoder can compare a cost measure for each of the angular IPPMs to determine which of the angular IPPMs provides the best encoding performance. Alternatively, the anchor angular IPPM for the current block is identified in some other way.

The video encoder also identifies (1320) multiple new angular IPPMs. The anchor angular IPPM and the multiple new angular IPPMs are, at least approximately, evenly spread throughout the range of angular IPPMs. For example, the anchor angular IPPM and the multiple new angular IPPMs are, at least approximately, evenly spaced from each other and separated from each other by multiple other angular IPPMs.

In some example implementations, the multiple new angular IPPMs include, relative to the anchor angular IPPM:
  a first new angular IPPM that is offset by approximately or exactly 45 degrees in a first direction;
  a second new angular IPPM that is offset by approximately or exactly 90 degrees in the first direction; and
  a third new angular IPPM that is offset by approximately or exactly 135 degrees in the first direction, or that is offset by approximately or exactly 45 degrees in a second direction opposite the first direction.

Figure 14A:
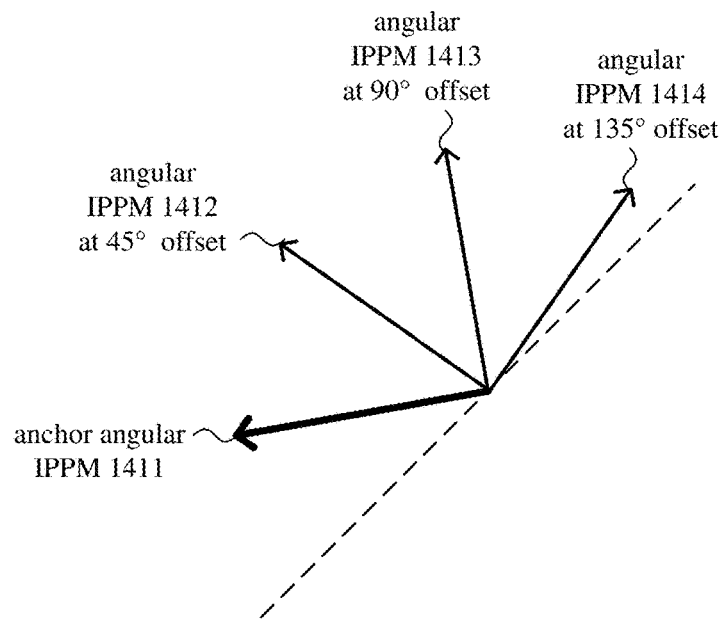
FIGS. 14a and 14b are diagrams illustrating diverse angular IPPMs evaluated according to the third example search strategy.
Figure 14B:
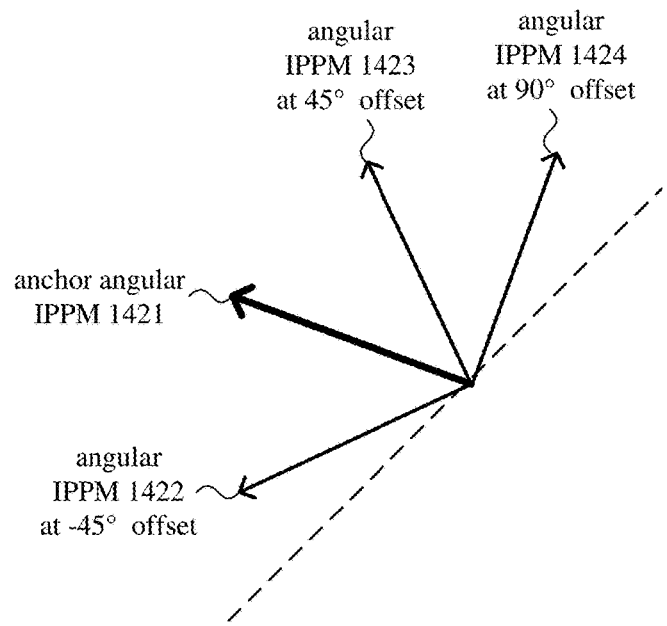

The first and second directions depend on the anchor angular IPPM—generally, the first direction is the direction in which there are more possible angular IPPMs. FIGS. 14a and 14b illustrate diverse angular IPPMs, which are evaluated according to the third example search strategy. The range of angular IPPMs in FIGS. 14a and 14b is the range of angular IPPMs shown in FIG. 5: IPPM 2 to IPPM 34. FIG. 14a shows an anchor angular IPPM (1411), an angular IPPM (1412) offset by 45 degrees from the anchor angular IPPM (1411) in a first direction, an angular IPPM (1413) offset by 90 degrees from the anchor angular IPPM (1411) in the first direction, and an angular IPPM (1414) offset by 135 degrees from the anchor angular IPPM (1411) in the first direction. FIG. 14b shows an anchor angular IPPM (1421), an angular IPPM (1423) offset by 45 degrees from the anchor angular IPPM (1421) in a first direction, an angular IPPM (1424) offset by 90 degrees from the anchor angular IPPM (1421) in the first direction, and an angular IPPM (1422) offset by 45 degrees from the anchor angular IPPM (1421) in the second direction. In FIGS. 14a and 14b, the angular IPPMs are evenly spaced through the range of angular IPPMs.

For the approach shown in FIGS. 14a and 14b, the video encoder can find the multiple new angular IPPMs as follows. The angular IPPMs are ordered according to angular direction as shown in FIG. 5, from IPPM 2 to IPPM 34. From the anchor angular IPPM, the video encoder evaluates IPPMs that are +8, +16, and +24 IPPMs away from the anchor angular IPPM, with adjustments to "roll over" the extremes of the range so that each of the new angular IPPMs is between IPPM 2 and IPPM 34.

$$IPPM_{new}[0]=2+((IPPM_{anchor}+8-2)\ \&\ 31);$$

$$IPPM_{new}[1]=2+((IPPM_{anchor}+24-2)\ \&\ 31);\ \text{and}$$

$$IPPM_{new}[2]=2+((IPPM_{anchor}+16-2)\ \&\ 31).$$

The angular IPPMs in FIG. 5 are not equidistant; therefore, the three values of $IPPM_{new}$ are at least approximately (but sometimes not exactly) 45, 90, and 135 (or −45) degrees away from the anchor angular IPPM.

Returning to FIG. 13, the video encoder evaluates (1330) each of the multiple new angular IPPMs. (The video encoder has previously evaluated the anchor angular IPPM.) The video encoder can perform (1340) a gradient search, starting from a best angular IPPM among the anchor angular IPPM and multiple new angular IPPMs. The video encoder selects (1350) a prediction mode for the current block (e.g., selecting the inter-picture prediction mode or one of the evaluated IPPMs, whichever is best).

A video encoder can conditionally perform the third search strategy (1300) when one or more conditions are satisfied. For example, some of the variations of the second search strategy (800) incorporate the third search strategy (1300).

G. Fourth Example Search Strategy

Figure 15:
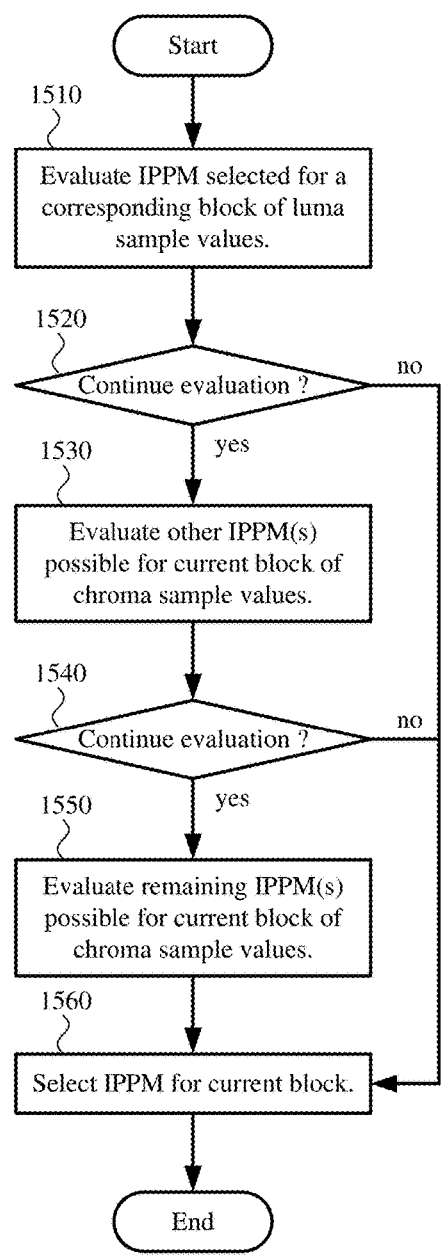
FIG. 15 is a flowchart illustrating an example search strategy when evaluating IPPMs for a current block of chroma sample values, according to which IPPMs are prioritized for evaluation.

FIG. 15 illustrates a fourth example search strategy (1500) when evaluating IPPMs for a current block of chroma sample values, according to which IPPMs are prioritized for evaluation. For example, a video encoder first evaluates one or more IPPMs that are most likely to improve encoding performance for a block of chroma sample values, then evaluates one or more simple IPPMs that are still somewhat likely to improve encoding performance for the block, and finally evaluates any remaining IPPMs for the block of chroma sample values.

The IPPMs that are possible for a block of chroma sample values depend on implementation. Typically, the IPPMs that are possible for a given block of chroma sample values are a subset of the IPPMs that are possible for a block of luma sample values, as defined according to bitstream syntax for a format or standard. FIG. 16 shows possible IPPMs (1600) for a given block of chroma sample values according the H.265/HEVC standard, along with code indices that may be used to signal the IPPM for the block of chroma sample values. According to the H.265/HEVC standard, the IPPM for a given block of chroma sample values can be planar (IPPM 0), DC (IPPM 1), horizontal (IPPM 10), vertical (IPPM 26), or the IPPM that was used by the corresponding block of luma sample values ($IPPM_{luma}$, which is shown as IntraPredModeY[xCb][yCb] in FIG. 16). In some cases (when $IPPM_{luma}$ is 0, 1, 10, or 26), the IPPM for the given block of chroma sample values can also be another angular IPPM (IPPM 34). Alternatively, the IPPMs possible for a block of chroma sample values include other and/or additional IPPMs.

With reference to FIG. 15, in a first stage of IPPM evaluation for the current block of chroma sample values, the video encoder evaluates (1510) an IPPM selected for a corresponding block of luma sample values ($IPPM_{luma}$). For example, for H.265/HEVC encoding, $IPPM_{luma}$ can be any of the IPPMs shown in FIG. 5. Alternatively, for another standard or format, $IPPM_{luma}$ is another IPPM.

Depending on the results of the first-stage evaluation, the video encoder continues with a second stage of IPPM evaluation. The video encoder checks (1520) whether to continue IPPM evaluation for the current block of chroma sample values. For example, the video encoder compares a cost of encoding the current block using IPPM$_{luma}$ to an implementation-dependent threshold, where performance of second-stage evaluation depends at least in part on results of the comparing. Cost information for the cost can be computed as a rate-distortion cost as described in section IV.B or computed in some other way. If the cost is less than the threshold (or, alternatively, less than or equal to the threshold), the video encoder stops IPPM evaluation for the current block of chroma samples, selecting (1560) the IPPM for the current block of chroma sample values to be IPPM$_{luma}$.

In a second stage, the video encoder evaluates (1530) one or more other IPPMs possible for the current block. The other IPPM(s) possible for the current block of chroma sample values depend on implementation. For example, for the IPPMs shown in FIG. 16, the other IPPM(s) evaluated by the video encoder include three of planar (IPPM 0), DC (IPPM 1), horizontal (IPPM 10), and vertical (IPPM 26). If IPPM$_{luma}$ is 0, 1, 10, or 26, the other IPPM(s) that are evaluated (1530) are the remaining three IPPMs of IPPM 0, IPPM 1, IPPM 10, and IPPM 26. Otherwise (IPPM$_{luma}$ is not 0, 1, 10, or 26) the other IPPM(s) that are evaluated (1530) are IPPM 0, IPPM 1, and IPPM 10. Alternatively, the other IPPM(s) that are evaluated are defined in some other way.

Depending on the results of the second-stage evaluation, the video encoder continues with a third stage of IPPM evaluation. The video encoder checks (1540) whether to continue IPPM evaluation for the current block of chroma sample values. For example, the video encoder compares a cost of encoding the current block using the IPPM selected in the second-stage evaluation (IPPM$_{second}$) to an implementation-dependent threshold, where performance of third-stage evaluation depends at least in part on results of the comparing. The threshold between the second stage and third stage can be the same as the threshold between the first stage and second stage, or the thresholds can be different. Cost information for the cost can be computed as a rate-distortion cost as described in section IV.B or computed in some other way. If the cost is less than the threshold (or, alternatively, less than or equal to the threshold), the video encoder stops IPPM evaluation for the current block of chroma samples, selecting (1560) the IPPM for the current block of chroma sample values to be IPPM$_{second}$.

Otherwise, in a third stage, the video encoder evaluates (1550) one or more remaining IPPMs possible for the current block of chroma sample values. The remaining IPPM(s) possible for the current block of chroma sample values depend on implementation. For example, for the IPPMs shown in FIG. 16, the remaining IPPM(s) evaluated by the video encoder include vertical (IPPM 26) or left-down angular mode (IPPM 34). If is 0, 1, 10, or 26, the remaining IPPM that is evaluated (1550) is IPPM 34. Otherwise (IPPM$_{luma}$ is not 0, 1, 10, or 26) the remaining IPPM that is evaluated (1550) is IPPM 26. Alternatively, the remaining IPPM(s) that are evaluated are defined in some other way. Finally, the video encoder selects (1560) one of the evaluated IPPMs as the IPPM for the block of chroma sample values.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. One or more computer-readable media storing computer-executable instructions for causing a processor, when programmed thereby, to perform operations comprising:
   receiving a current picture of a video sequence; and
   encoding the current picture, including, for a current block of the current picture, evaluating at least some of multiple intra-picture prediction modes ("IPPMs") according to a search strategy, the search strategy including:
      identifying an anchor angular IPPM among the multiple IPPMs, the multiple IPPMs having a range of angular IPPMs;
      identifying multiple new angular IPPMs by applying offsets relative to the anchor angular IPPM, the anchor angular IPPM and the multiple new angular IPPMs being, at least approximately, evenly spread throughout the range of angular IPPMs, wherein identifying the multiple new angular IPPMs comprises:
         determining one or more new angular IPPMs in a first direction relative to the anchor angular IPPM; and
         determining one or more new angular IPPMs in a second direction, opposite the first direction, relative to the anchor angular IPPM; and
      evaluating each of the multiple new angular IPPMs.

2. The one or more computer-readable media of claim 1, wherein the search strategy further comprises:
   evaluating one or more most probable modes ("MPMs") among the multiple IPPMs, wherein the anchor angular IPPM is one of the one or more MPMs.

3. The one or more computer-readable media of claim 2, wherein the identifying the anchor angular IPPM includes comparing a cost measure for each angular IPPM among the one or more MPMs.

4. The one or more computer-readable media of claim 1, wherein the anchor angular IPPM and the multiple new angular IPPMs are, at least approximately, evenly spaced from each other and separated from each other by multiple other angular IPPMs of the multiple IPPMs.

5. The one or more computer-readable media of claim 1, wherein the multiple new angular IPPMs include, relative to the anchor angular IPPM:
   a first new angular IPPM that is offset by approximately or exactly 45 degrees in the first direction;
   a second new angular IPPM that is offset by approximately or exactly 90 degrees in the first direction; and
   a third new angular IPPM that is offset by approximately or exactly 45 degrees in the second direction opposite the first direction.

6. The one or more computer-readable media of claim 1, wherein the search strategy further comprises:
   performing a gradient search starting from a best angular IPPM among the anchor angular IPPM and the multiple new angular IPPMs.

7. The one or more computer-readable media of claim 1, wherein the identifying the anchor angular IPPM, the identifying the multiple new angular IPPMs, and the evaluating each of the multiple new angular IPPMs are contingent on satisfaction of one or more conditions in the search strategy.

8. In a computer system, a method comprising:
receiving a current picture of a video sequence; and
encoding the current picture, including, for a current block of the current picture, evaluating at least some of multiple intra-picture prediction modes ("IPPMs") according to a search strategy, the search strategy including:
identifying an anchor angular IPPM among the multiple IPPMs, the multiple IPPMs having a range of angular IPPMs;
identifying multiple new angular IPPMs by applying offsets relative to the anchor angular IPPM, the anchor angular IPPM and the multiple new angular IPPMs being, at least approximately, evenly spread throughout the range of angular IPPMs, wherein identifying the multiple new angular IPPMs comprises:
determining one or more new angular IPPMs in a first direction relative to the anchor angular IPPM; and
determining one or more new angular IPPMs in a second direction, opposite the first direction, relative to the anchor angular IPPM; and
evaluating each of the multiple new angular IPPMs.

9. The method of claim 8, wherein the search strategy further comprises:
evaluating one or more most probable modes ("MPMs") among the multiple IPPMs, wherein the anchor angular IPPM is one of the one or more MPMs.

10. The method of claim 9, wherein the identifying the anchor angular IPPM includes comparing a cost measure for each angular IPPM among the one or more MPMs.

11. The method of claim 8, wherein the anchor angular IPPM and the multiple new angular IPPMs are, at least approximately, evenly spaced from each other and separated from each other by multiple other angular IPPMs of the multiple IPPMs.

12. The method of claim 8, wherein the multiple new angular IPPMs include, relative to the anchor angular IPPM:
a first new angular IPPM that is offset by approximately or exactly 45 degrees in the first direction;
a second new angular IPPM that is offset by approximately or exactly 90 degrees in the first direction; and
a third new angular IPPM that is offset by approximately or exactly 45 degrees in the second direction opposite the first direction.

13. The method of claim 8, wherein the search strategy further comprises:
performing a gradient search starting from a best angular IPPM among the anchor angular IPPM and the multiple new angular IPPMs.

14. The method of claim 8, wherein the identifying the anchor angular IPPM, the identifying the multiple new angular IPPMs, and the evaluating each of the multiple new angular IPPMs are contingent on satisfaction of one or more conditions in the search strategy.

15. A computer system comprising a processor and memory, wherein the computer system implements a video encoder system configured to perform operations comprising:
receiving a current picture of a video sequence; and
encoding the current picture, including, for a current block of the current picture, evaluating at least some of multiple intra-picture prediction modes ("IPPMs") according to a search strategy, the search strategy including:
identifying an anchor angular IPPM among the multiple IPPMs, the multiple IPPMs having a range of angular IPPMs;
identifying multiple new angular IPPMs by applying offsets relative to the anchor angular IPPM, the anchor angular IPPM and the multiple new angular IPPMs being, at least approximately, evenly spread throughout the range of angular IPPMs, wherein identifying the multiple new angular IPPMs comprises:
determining one or more new angular IPPMs in a first direction relative to the anchor angular IPPM; and
determining one or more new angular IPPMs in a second direction, opposite the first direction, relative to the anchor angular IPPM; and
evaluating each of the multiple new angular IPPMs.

16. The computer system of claim 15, wherein the search strategy further comprises:
evaluating one or more most probable modes ("MPMs") among the multiple IPPMs, wherein the anchor angular IPPM is one of the one or more MPMs.

17. The computer system of claim 16, wherein the identifying the anchor angular IPPM includes comparing a cost measure for each angular IPPM among the one or more MPMs.

18. The computer system of claim 15, wherein the anchor angular IPPM and the multiple new angular IPPMs are, at least approximately, evenly spaced from each other and separated from each other by multiple other angular IPPMs of the multiple IPPMs.

19. The computer system of claim 15, wherein the multiple new angular IPPMs include, relative to the anchor angular IPPM:
a first new angular IPPM that is offset by approximately or exactly 45 degrees in the first direction;
a second new angular IPPM that is offset by approximately or exactly 90 degrees in the first direction; and
a third new angular IPPM that is offset by approximately or exactly 45 degrees in the second direction opposite the first direction.

20. The computer system of claim 15, wherein the search strategy further comprises:
performing a gradient search starting from a best angular IPPM among the anchor angular IPPM and the multiple new angular IPPMs.

21. The computer system of claim 15, wherein the identifying the anchor angular IPPM, the identifying the multiple new angular IPPMs, and the evaluating each of the multiple new angular IPPMs are contingent on satisfaction of one or more conditions in the search strategy.

22. The one or more computer-readable media of claim 1, wherein the offsets are specified as angle differences or IPPM differences relative to the anchor angular IPPM.

23. The method of claim 8, wherein the offsets are specified as angle differences or IPPM differences relative to the anchor angular IPPM.

24. The one or more computer-readable media of claim 1, further comprising:
determining which direction has more possible angular IPPMs; and
setting the first direction to the direction determined to have the more possible angular IPPMs.

* * * * *